(12) United States Patent
Jerrim et al.

(10) Patent No.: US 7,895,326 B2
(45) Date of Patent: *Feb. 22, 2011

(54) NETWORK SERVICE ZONE LOCKING

(75) Inventors: John Jerrim, Gainesville, GA (US);
John A. Copeland, III, Atlanta, GA (US)

(73) Assignee: Lancope, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/628,892

(22) Filed: Dec. 1, 2009

(65) Prior Publication Data

US 2010/0138535 A1    Jun. 3, 2010

Related U.S. Application Data

(63) Continuation of application No. 10/106,298, filed on Mar. 25, 2002, now Pat. No. 7,644,151.

(51) Int. Cl.
*G06F 15/173* (2006.01)

(52) U.S. Cl. .................. 709/224; 709/225; 726/22; 726/26

(58) Field of Classification Search .......... 709/203, 709/223, 224, 225, 227, 212
See application file for complete search history.

(56) References Cited

U.S. PATENT DOCUMENTS

| 5,375,244 A | 12/1994 | McNair |
| 5,557,686 A | 9/1996 | Brown et al. |
| 5,557,742 A | 9/1996 | Smaha et al. |
| 5,621,889 A | 4/1997 | Lermuzeaux et al. |
| 5,796,942 A | 8/1998 | Esbensen |
| 5,825,750 A | 10/1998 | Thompson |
| 5,970,227 A | 10/1999 | Dayan et al. |
| 5,991,881 A * | 11/1999 | Conklin et al. ............... 726/22 |
| 6,119,236 A | 9/2000 | Shipley |
| 6,182,226 B1 * | 1/2001 | Reid et al. ............... 726/15 |
| 6,275,942 B1 | 8/2001 | Bernhard et al. |
| 6,321,338 B1 | 11/2001 | Porras et al. |
| 6,363,489 B1 * | 3/2002 | Comay et al. ............... 726/22 |

(Continued)

FOREIGN PATENT DOCUMENTS

WO            00/34847 A1    6/2000

(Continued)

OTHER PUBLICATIONS

Barford, Paul, et al., Characteristics of Network Traffic Flow Anomalies, ACM SIGCOMM Internet Measurement Workshop 2001 (http://www.cs.wisc.edu/pb/ublications.html), Jul. 2001.

(Continued)

*Primary Examiner*—Barbara N Burgess
(74) *Attorney, Agent, or Firm*—Morris Manning Martin LLP; John R. Harris, Esq.

(57) ABSTRACT

A zone locking system detects unauthorized network usage internal to a firewall. The system determines unauthorized network usage by classifying internal hosts inside a firewall into zones. Certain specified zones are unauthorized to initiate client communications with other selected zones. However, zone override services can be designated for each associated internal zone, and thus, authorizing selected network services. An alarm or other appropriate action is taken upon the detection of unauthorized network usage.

83 Claims, 13 Drawing Sheets

U.S. PATENT DOCUMENTS

| | | | |
|---|---|---|---|
| 6,453,345 | B2 | 9/2002 | Trcka et al. |
| 6,502,131 | B1 | 12/2002 | Vaid et al. |
| 6,628,654 | B1 | 9/2003 | Albert et al. |
| 6,853,619 | B1 | 2/2005 | Grenot |
| 6,891,839 | B2 | 5/2005 | Albert et al. |
| 7,017,186 | B2 | 3/2006 | Day |
| 2002/0103903 | A1* | 8/2002 | Bruton et al. ............... 709/225 |
| 2002/0104017 | A1* | 8/2002 | Stefan ........................ 713/201 |
| 2002/0133586 | A1* | 9/2002 | Shanklin et al. ............. 709/224 |
| 2004/0187032 | A1* | 9/2004 | Gels et al. ................... 713/201 |
| 2004/0237098 | A1* | 11/2004 | Watson et al. ................. 725/25 |
| 2006/0123482 | A1* | 6/2006 | Aaron ......................... 726/25 |

FOREIGN PATENT DOCUMENTS

WO          01/31420 A2      5/2001

OTHER PUBLICATIONS

Cooper, Mark, An Overview of Intrusion Detection Systems, Xinetica White Paper, (www.xinetica.com), Nov. 19, 2001.

Copeland, John A. et al., IP Flow Identification for IP Traffic Carried Over Switched Networks, The International Journal of Computer and Telecommunications Networking Computer Networks 31 (1999), pp. 493-504.

Debar. et al., Towards a Taxonomy of Intrusion-Detection Systems, Computer Networks, Elsevier Science Publishers, B.V., Amsterdam, NL Apr. 23, 1999, pp. 805-822.

Frincke, Deborah, et al., A Framework for Cooperative Intrusion Detection, 21st National Information Systems Security conference, Oct. 1998, Crystal City, VA.

Javitz H S et al., The SRI IDES Statistical Anomaly Detector, Proceedings of the Symposium on Research in Security and Privacy US Los Alamitos, IEEE Camp. Soc. Press, v. Symp. 12, pp. 316-326 XPOO02208031SBN: 0-8186-2168-0, p. 316, col. 1, line 1, p. 318, col. 1, line 3.

Ato, et al., A Real-Time Intrusion Detection System for Large Scale Networks and its Evaluations, Ieice Transactions on Communications, Institute of Electronics Information and Comm Enn Tokyo, Japan: Nov. 1999 pp. 1817-1825.

LANSleuth Fact Sheet, LANSleuth LAN Analyzer for Ethernet and Token Ring Networks, (www.lansleuth.com/features.html) Aurora, Illinois.

LANSleuth General Features, (www.lansleuth.com/features.html) Aurora, Illinois.

Lunt T F et al., Knowledge-based Intrusion Detection, Proceedings of the Annual Artificial Intelligence Systems in Government Conference US, Washington, IEEE Camp. Soc. Press, vol. Conf. 4, pp. 102-107 XP000040018 p. 102, col. 1, line 1, p. 105, col. 2, line 21.

Mahoney, M., Network Traffic Anomaly Detection Based on Packet Bytes, ACM, 2003, FI. Institute of Technology, entire document, http://sss.cs.fit.edu/~mmahoney/paper6.pdf.

Mukherjee, Biswanath, et al., Network Intrusion Detection, IEEE Network, May/Jun. 1994.

Networking-vs-Host-Based Intrusion Detection: A Guide to Intrusion Detection Technology ISS Internet Security Systems, Oct. 2, 1998, Atlanta, GA.

Newman, P., et al. RFC 1953: Ipsilon Flow Management Protocol Specification for IPv4 Version 1.0 (www.xyweb.com/rfc/rfc1953.html) May 19, 1999.

Paxson, Vern, Bro: A System for Detecting Network Intruders in Real-Time, 7th USENIX Security Symposium, Lawrence Berkkeley National Laboratory, San Antonio, TX, Jan. 26-29, 1998.

Phrack Magazine, vol. 8, Issue 53, Jul. 8, 1998, Article 11 of 15.

Planquart, Jean-Philippe, Application of Neural Networks to Intrusion Detection, SANS Institute, Jul. 29, 2001, entire document.

* cited by examiner

FIG. 1 NETWORK DATA COLLECTION

PACKET HEADERS

TCP/IP SESSION
500

FIG. 13

NETWORK SERVICE ZONE LOCKING

CROSS REFERENCE TO RELATED APPLICATIONS

This application is a continuation and claims benefit of U.S. patent application Ser. No. 10/106,298, filed Mar. 25, 2002, Entitled "Network Service Zone Locking", by John Jerrim et al., now U.S. Pat. No. 7,644,151, the disclosure of which is hereby incorporated herein in its entirety by reference.

This is a continuation-in-part of the U.S. patent application Ser. No. 10/062,621 entitled "Network Port Profiling" filed on Jan. 31, 2002, which is incorporated in its entirety by reference and made a part hereof. This application is related to the U.S. non-provisional patent application Ser. No. 10/000, 396 and PCT patent application PCT/US01/45,275, both entitled "Flow-Based Detection of Network Intrusions" and filed 30 Nov. 2001, both of which are hereby incorporated by reference in their entirety and made part hereof.

REFERENCE TO COMPUTER PROGRAM LISTING SUBMITTED ON CD

This application incorporates by reference the computer program listing appendix submitted on (1) CD-ROM entitled "Network Service Zone Locking Program Listing" in accordance with 37 C.F.R. §1.52(e). Pursuant to 37 C.F.R. §1.77 (b)(4), the material on said CD-ROM is incorporated by reference herein, said material being identified as follows:

| Size in Bytes | Date of Creation | File Name |
| --- | --- | --- |
| 154,450 | Mar. 25, 2002 | LANcope Code.txt |

A portion of the disclosure of this patent document including said computer code contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention relates generally to the field of network monitoring and, more particularly, to a detection system that monitors network activity by identifying hosts, categorizing the hosts into zones, and alarming on network communications between zones that are not authorized.

BACKGROUND ART

Networks have become indispensable for conducting all forms of business and personal communications. Networked systems allow one to access needed information rapidly, collaborate with partners, and conduct electronic commerce. The benefits offered by Internet technologies are enormous. While computer networks revolutionize the way one does business, risks are introduced. Unauthorized network usage can lead to network congestion or even system failures. Furthermore, attacks on networks can lead to lost money, time, reputation, and confidential information. Effective network monitoring can mitigate these system problems.

High network availability is critical for many enterprises. Many performance problems are related to capacity issues. Unauthorized network usage can slow down the performance of mission critical applications and monopolize available bandwidth. Some unauthorized applications, like a Trojan Horse, can erase or degrade essential data as well possibly provide access to vital confidential information.

Consequently, one primary danger to avoid is having outside intruders gain control of a host on a network. Once control is achieved, private company files can be downloaded, the controlled host can be used to attack other computers inside the firewall, or the controlled host can scan or attack computers anywhere in the world. Many organizations have pursued protection by the implementation of firewalls and intrusion detection systems (IDS). However, no avoidance measures are fail safe. Therefore, monitoring for the presence of unauthorized applications and unauthorized activity is important.

Firewalls merely limit access between networks. Firewalls are typically designed to filter network traffic based on attributes such as source or destination addresses, port numbers, or transport layer protocols. However, firewalls are susceptible to maliciously crafted traffic designed to bypass the blocking rules established. Additionally, firewalls do not provide control of the activities of hosts that are communicating internally behind the established firewalls.

Almost all commercially available IDS are signature-based detection systems or anomaly-based systems. Signature-based detection systems piece together the packets in a connection to collect a stream of bytes being transmitted. The stream is then analyzed for certain strings of characters in the data commonly referred to as "signatures." These signatures are particular strings that have been discovered in known exploits. The more signatures that are stored in a database, the longer it takes to do an exhaustive search on each data stream. For larger networks with massive amounts of data transferred, a string comparison approach is unfeasible. Substantial computing resources are needed to analyze all of the communication traffic.

Even if a known exploit signature has been discovered, the signature is not useful until it is has been installed and is available to the network. In addition, signature analysis only protects a system from known attacks. Yet, new attacks are being implemented all the time. Unfortunately, a signature-based detection system would not detect these new attacks and therefore, leaves the network vulnerable.

Another approach to intrusion detection includes detection of unusual deviation from normal data traffic commonly referred to as "anomalies." Like signature-based detection systems, many current anomaly-based intrusion detection systems only detect known methods of attack. Some of these known anomaly-based attacks include TCP/IP stack fingerprinting, half-open attacks, and port scanning. However, systems relying on known attacks are easy to circumnavigate and leave the system vulnerable. In addition, some abnormal network traffic happens routinely, often non-maliciously, in normal network traffic. For example, an incorrectly entered address could be sent to an unauthorized port and be interpreted as an abnormality. Consequently, known anomaly-based systems tend to generate an undesirable number of false alarms, which creates a tendency for all alarms to be ignored.

Some known intrusion detection systems have tried to detect statistical anomalies. This approach involves measuring a baseline and then triggering an alarm when deviation is detected. For example, if a system typically has no traffic from individual workstations at 2 AM, activity during this time frame would be considered suspicious. However, baseline systems have typically been ineffective because the small amount of malicious activity is masked by the large amounts of highly variable normal activity. On the aggregate, it is extremely difficult to detect the potential attacks.

Other intrusion detection systems compare long term profiled data streams to short term profiled data streams. One such system is described in U.S. Pat. No. 6,321,338 to Porras et al. entitled "Network Surveillance." The system described in this patent does not necessarily analyze all the network traffic, but instead focuses on narrow data streams. The system filters data packets into various data streams and compares short term profiles to profiles collected over a long period. However, data traffic is typically too varied to meaningfully compare short term profiles to long term profiles. For example, merely because the average (File Transfer Protocol) FTP streams may be 3 megabytes over the long term does not indicate that a 20 megabyte stream is an anomaly. Consequently, these systems generate a significant amount of false alarms or the malicious activity can be masked by not analyzing the proper data streams.

Failure to detect the operation of malicious unauthorized application, such as a Trojan Horse, can cause serious harm to a company. A Trojan Horse is a program in which harmful code is contained inside an apparently harmless program or data in such a way that it can gain control of the computer or otherwise do it designed form of damage. A Trojan Horse or virus that penetrates a firewall can cause tremendous damage and spread internally across a local area network.

However, other unauthorized network usage can also be harmful. Employees may waste time and resources by installing and playing games over the network. An authorized web site may utilize crucial bandwidth by providing materials such as pictures, streaming audio, or movies. Even a chat program can waste time and network assets. Valuable resources can also be monopolized by these types of unauthorized network activities. Many of these services can operate behind the firewall, and consequently, a system administrator is not able to effectively control these usages.

Filtering tables in a local area network (LAN) bridge device may allow a system administrator to block communications between particular hosts with other hosts physically connected to a different local area network segments. Filtering tables inhibit forwarding of frames between particular sets of Medium Access Control protocol (MAC) addresses between local area networks (LANs). However, filtering tables do control activities within a collision domain. Furthermore, filtering tables typically only control communications based upon MAC address and not on the service utilized. However, a system administrator may desire to restrict communications between hosts but still allow certain services.

Consequently, a monitoring system is needed that can detect the operation of unauthorized network services. The system needs to be able to differentiate between legitimate network usage and unauthorized activity. Additionally, the system needs to be able to control unauthorized network usage behind a system's firewall. Furthermore, the detection system must be able to function even with the data traffic of larger networks. As a result, a system is needed to alarm upon detection of the operation of any authorized network service in use on any monitored host computer including services utilized inside a firewall.

DISCLOSURE OF THE INVENTION

The present invention provides a more accurate and reliable method for detecting unauthorized network usage based upon zone locking which can be implemented in conjunction with a port profiling system. This novel detection system does not require a known signature database of known attacks. Instead, the monitoring system inspects inbound and outbound activity and can identify new services that are not listed on that host's service profile. Additionally, internal hosts inside a firewall can be categorized into zones. Unauthorized services between established zones can generate an alarm or other appropriate action. The computational simplicity of the technique allows for operation at much higher speeds than is possible with other detection systems on comparable hardware. Furthermore, this invention allows the control of network usage internal to a firewall based upon the network services utilized.

According to one aspect of the invention, the detection system works by classifying internal hosts into zones and setting policy that specify which communications among zones are unauthorized. Packet and frame header information is collected to determine the associated network service and the associated zones for each communication. If the communication is unauthorized, an alert is issued and appropriate action can be taken.

Generally speaking, the system determines unauthorized network usage by classifying internal hosts inside a firewall into zones. The host zone data is received by the classification of internal hosts into the internal zones. Certain specified zones are unauthorized to initiate communications with other selected zones. According to an aspect of the invention, these unauthorized internal zones are not authorized to initiate network communications or act as a client with the associated internal zone. The unauthorized zone data specifies which designated internal zones are not authorized to communicate with which associated unauthorized zones. However, zone override services can be designated for each associated internal zone, and thus, authorizing selected network services. The override service data specifies which particular network services in which designated internal zones are authorized to participate with the associated unauthorized zones.

The monitoring system is operable to capture header information from monitored network communications. Internal zones participating in the monitored network communications are identified from the header information. The header information provides the necessary data to determine which internal hosts are participating in the monitored network communications. Thus, the host zone data enables the determination of which internal zones are participating in the monitored zone communications.

Unauthorized network usage can be determined based upon the unauthorized zone data and the override service data. Exempt zone communications from an unauthorized zone can be determined from the system administrator's selected associated zone override services.

As a result, unauthorized zone communications for each associated internal zone participating in communications with any associated unauthorized internal zone is readily determined. An alarm or other appropriate action can be taken upon detection of the unauthorized network usage.

BRIEF DESCRIPTION OF THE DRAWINGS

Benefits and further features of the present invention will be apparent from a detailed description of preferred embodiment thereof taken in conjunction with the following drawings, wherein like elements are referred to with like reference numbers, and wherein:

FIG. 13 is an exemplary screen shot of custom traffic monitoring exceptions.

BEST MODE

The described embodiment discloses a system that provides an efficient, reliable and scalable method of monitoring unauthorized services by a host computer. Unauthorized network service are detected by a port profiling engine that monitors activity to differentiate between abnormal activity and normal communications. The port profiling engine does not rely on analyzing the data of packets for signatures of known attacks. Analyzing character strings for known attack signatures is extremely resource intensive and does not protect against new unknown attacks.

Instead, the monitoring system inspects inbound and outbound activity and identifies the services utilized by the hosts. Upon identification of the hosts, the system determines zones of the hosts participating in the network communication. The system alarms on detection of communications between zones that are not authorized. By analyzing communications for service activity, unauthorized network usage can be determined without the need for resource intensive packet data analysis.

Having a port profile available for a computer network, and the ability to build up automatically, edit, display, monitor, display changes, and alarm on changes is extremely valuable to a network administrator who wants to know what is transpiring over the network. Service port monitoring is the one of best ways to detect the start up of Trojan Horse programs that communicate over the network, as well as undesired applications that may be installed by users. Additionally, zone locking allows a system administrator to restrict activities behind a firewall.

However, it is useful to discuss the basics of Internet communications to gain an understanding of the operation of the port profiling engine performing zone locking. Consequently, initially an overview of a network data flow will be discussed. Following the overview is a detailed description of the operation of the port profiling and zone locking system. Next, discussions on various aspects of Internet communications will follow. After that, a detailed functionality of the port profiling engine of the present invention is described in further detail. Finally, illustrated are exemplary screenshots of the inputs for zone locking.

Port Profiling Data Collection

Figure 1:
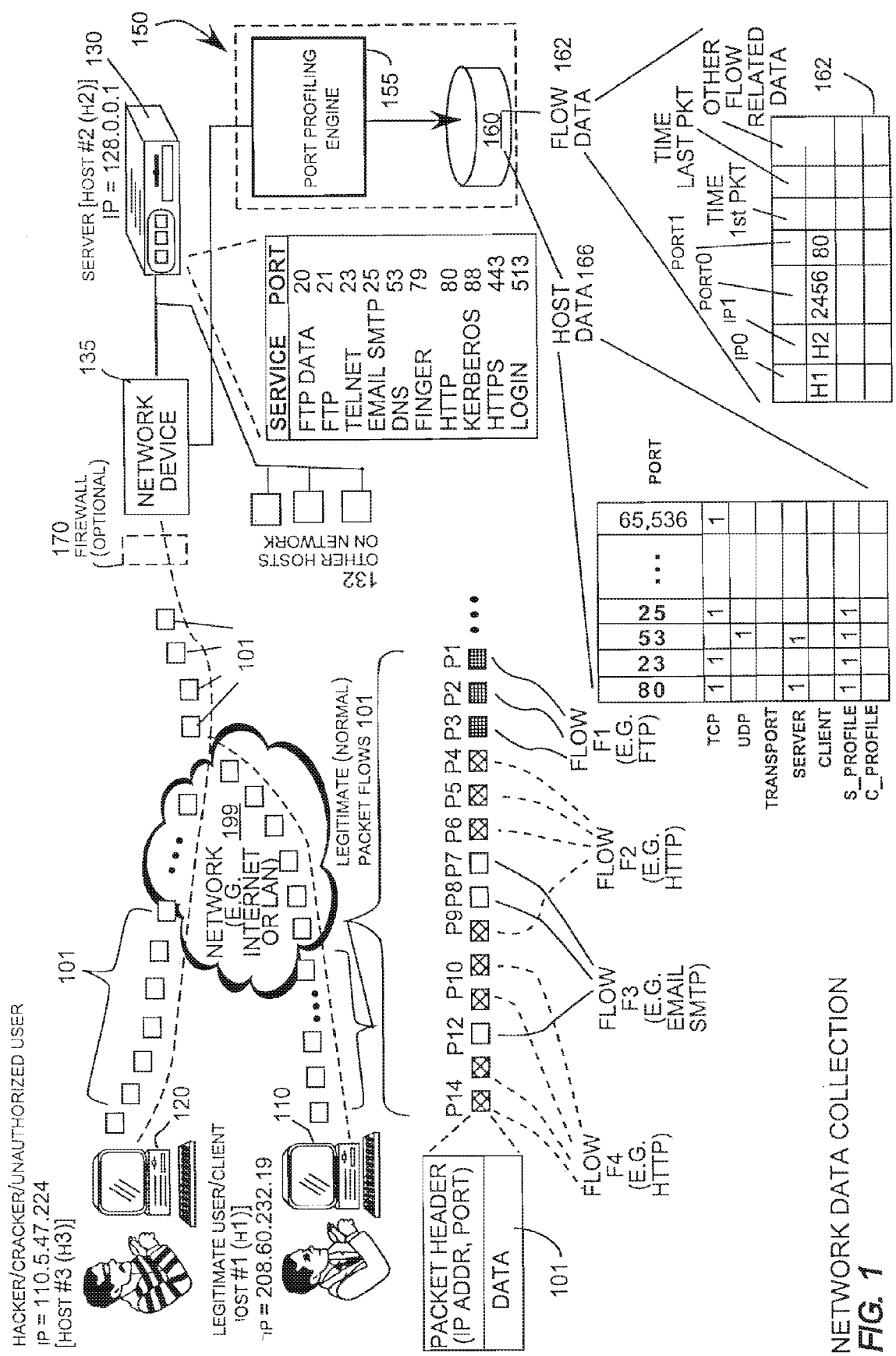
FIG. 1 is a functional block diagram illustrating network data collection for a port profiling system constructed in accordance with a preferred embodiment of the present invention.

Turning to the figures, in which like numerals indicate like elements throughout the several figures, FIG. 1 provides an overview of data collection for a port profiling engine 155 in accordance with an exemplary embodiment of the present invention. The port profiling engine 155 monitors network computer communications. The network computer communications are routed via a known global computer network commonly known as the Internet 199. In accordance with an aspect of the invention, the port profiling engine 155 is incorporated into a monitoring appliance 150, together with a database 160 that stores information utilized in the port profiling methodology.

The operating environment of the port profiling engine 155 is contemplated to have numerous hosts connected by the Internet 199, e.g. Host #1, Host #2, Host #3 (also referred to as H1-H3 respectively). Hosts are any computers that have full two-way access to other computers on the Internet 199 and have their own unique (Internet Protocol) IP address. For example Host #1 has an exemplary IP address of 208.60.239.19. The Internet 199 connects clients 110 with a host server 130 in known client/server relationship.

In a typical configuration, some computers are referred to as "servers", while others are referred to as "clients." A server computer such as Host #2 130 typically provides responses to requests from client computers and provides services, data, resources, and the like. In contrast, a client computer such as Host #1 110 typically requests and utilizes the services, data, resources, and the like provided by the server.

It is known in the art to send communications between hosts via the Internet 199. Communication protocols define rules for sending blocks of data from one network node to another node. The Internet Protocol (IP) is the method by which data is sent from one network to another network on the Internet 199. Each host on the Internet 199 has an IP address that uniquely identifies it from all other computers. Illustrated is a user/client 110, host #1 (H1), with an exemplary IP address of 208.60.239.19 and a server, host #2 (H2), with an IP address of 128.0.0.1.

When data is transmitted, the message gets divided into packets 101. Packets 101 are discussed in more detail in reference to FIG. 4. Each IP packet 101 includes a header that contains both the sender's Internet address and receiver's Internet address. The packets 101 are forwarded to the computer whose address is specified. As shown, a client 110 communicates with a server 130 by sending packets 101 of data. A packet 101 is a unit of data that is routed between an origin and destination. As illustrated, messages are segmented into numerous packets 101 and routed via the Internet 199 to the receiving host. The receiving host reassembles the stream of packets 101 to recreate the original message, which is then handled by application programs running on the receiving computer system.

However, some of the hosts may be intruders 120, commonly referred to as hackers or crackers. Intruders 120 exploit vulnerable computers. As shown in FIG. 1, the intruder 120 is a host with its own exemplary IP address of 110.5.47.224. The intruder 120 also communicates by sending packets 101 via the Internet 199. As previously stated, the packets 101 contain the IP address of the originator and destination to ensure proper routing. As shown, the stream of packets 101 sent by the intruder 120 can be interleaved with the packets 101 sent by other hosts. The packets 101 contain header information that enables the receiving host to reassemble the interleaved stream of packets into the original messages as sent.

Normal client/server communication activity includes sending e-mails, Web traffic, file transfers, and the like. Communications via the Internet 199 need to be sent to a specific IP address and to a specific service contact port. A "port" is known to those skilled in the art as an arbitrarily assigned number to which a particular type of computing service is assigned in conventional Internet computer-to-computer communications, e.g. web traffic is conventionally on port 80, FTP traffic on ports 20 and 21, etc. The IP address specifies a specific host while the service contact port number identifies a particular server program or service that the host computer may provide. Present day port numbers for Internet Protocol version 4 (IPv4) range from 0 to 65,535. Internet Protocol next generation (IPng) or Internet Protocol version 6 (IPv6) is designed to allow for the expansion of the Internet including expanded routing and address capabilities. The header will still include the source address and destination addresses as well as a next header in which the host's service port can be defined.

As shown in FIG. 1, a number of frequently-used services or processes have conventionally assigned service contact port numbers and are referred to as well-known port numbers maintained by the Internet Assigned Number Authority (TANA). These assigned port numbers are well known in the art and are typically the low numbered ports between 0 and 1023. Currently, certain higher numbered ports have also been registered.

A service port chart in FIG. 1 lists some common services that present day Internet-based computer systems may provide. Outgoing email typically utilizes the known Simple Mail Transfer Protocol (SMTP) which is implemented over the service contact port 25. For the Hypertext Transfer Protocol (HTTP) communications, Web browsers open an ephemeral high port number to initiate Web traffic that is sent to the host server port 80. File Transfer Protocol (FTP) control communications are sent to the server port 21, while FTP data transfer originates from port 20. The FINGER service utilizes service port 79, the domain name service (DNS) utilizes service port 53, and Telnet communications utilize service contact port 23. As illustrated, common services are typically associated with specific predetermined service contact ports.

For discussion and explanation purposes, illustrated in FIG. 1 are four exemplary flows, F1 through F4, between by client host #1 110 and service host #2 130. Flow F1 is a file transfer utilizing the File Transfer Protocol (FTP). As shown, the file transfer (flow F1) is delivered by a stream of packets 101 (P1-P3) that will be reassembled by the receiving host 110.

After the file transfer is completed, the client 110 initiates an HTTP Web session (flow F2) with server 120. Those skilled in the art understand that a Web session typically occurs when an Internet browser computer program such as MICROSOFT INTERNET EXPLORER or NETSCAPE NAVIGATOR requests a web page from a World Wide Web (WWW) service on port 80. Packets P4, P5, P6, and P9 are associated with the Web traffic of flow F2. These packets may contain data such as a JPG format picture to be displayed, text, a JAVA program, or other informational materials to be displayed or handled by the client's Internet browser program.

Continuing the example of FIG. 1, while the web session of flow F2 is still open, the client 110 sent an email illustrated by flow F3. As shown, the email packets of flow F3 may be interleaved with the previously opened Web session of flow F2. As illustrated, packets P7, P8, and P12 contain the e-mail message.

Finally, the client 110 requests another web page from the server 120, initiating yet another HTTP flow F4. Packets P9, P10, P11, P12, and P14 represent the new Web traffic.

Intruders 120 send data over the network intending to do harm or to scout details about the hosts on the network that will let them do harm in future. Because intruders 120 have different objectives, intruders 120 typically send communications that are not normal for client/server communications. For example, intruders may scan numerous high number ports which would not happen in normal client/server communications or an intruder may send a User Datagram Protocol (UDP) packet, which is commonly used with streaming media, with no data attached. An intruder may attempt to identify which operating system a host is utilizing by sending a packet with an undefined set of TCP flags. A high number of TCP packets 101 to a single host from another host may indicate a "half open" attack trying to tie up the target's resources. Each of these suspicious activities is not customarily seen in normal network traffic.

Probes and other communications that do not transfer data are not considered legitimate flows. If an unauthorized network usage detection system analyzed and consequently generated an alarm for each of these communications, numerous alarms would be generated creating a tendency for a network administrator to ignore all alarms. Instead, these communications are customarily blocked by firewalls or detected by an intrusion detection system. Therefore, an exemplary port profiling system will monitor just the legitimate flows to detect unauthorized network usage. Consequently, a port profiling engine will monitor flows to determine legitimate flows in which data is transferred.

In accordance with an aspect of the invention, the port profiling engine 155 works by assigning data packets 101 to various legitimate flows. A legitimate flow is a communication in which data is sent and acknowledged. Port scans and some other illegitimate flows typically do not send data with the packets 101, or if they do, the packets are usually rejected by a TCP "Reject" packet or a ICMP "Unavailable" packet.

The engine 155 collects port information associated with each flow and stores this information in a database 160. As shown in FIG. 1, the database 160 comprises a flow data structure 162 and a host data structure 166.

The flow data structure 162 stores collected flow information such as the IP addresses and MAC addresses. The engine 155 determines which host has a lower IP address and assigns that host IP0. The other host is assigned IP1. Port0 is associated with IP0 and Port1 is the service connection port for IP1. The flow data structure 162 also stores time and other related packet information derived from the packet header. In the disclosed embodiment, this time information (e.g. time of the first packet, time of the last packet) is utilized to measure the elapse of time for purposes of flow delimiting.

The host data structure 166 maintains the port profiling information. Port profiling entails keeping two lists for each of the hosts: 1) a list by port number (0, 65,536), protocol (TCP or UDP), and type of operation (client or server) for all allowed network services that are in the hosts profile; and 2) a corresponding list of network services that have been seen today. The host data structure is described in greater detail in reference to FIG. 2.

In a typical preferred configuration for the present invention, a monitoring appliance 150 operating a port profiling engine 155 is coupled to one of the network devices 135 such as routers, switches, or hubs or to a tap in a Internet backbone link. The monitoring appliance 150 monitors the communications among the various "inside" hosts 130, 132 on the network and outside hosts 110, 120 in the attempt to detect unauthorized network activity. Inside hosts are those hosts 130, 132 of an organization in which a network administrator is concerned with unauthorized network usage. It will be recognized that the inside network includes the associated network devices 135 such as hubs, switches, or routers. Typically, inside hosts are behind a firewall 170. Of course, those skilled in the art will appreciate that the port profiling engine 155 or appliance 150 can operate with or without the existence of any firewalls 170.

Port Profiling

Figure 2:
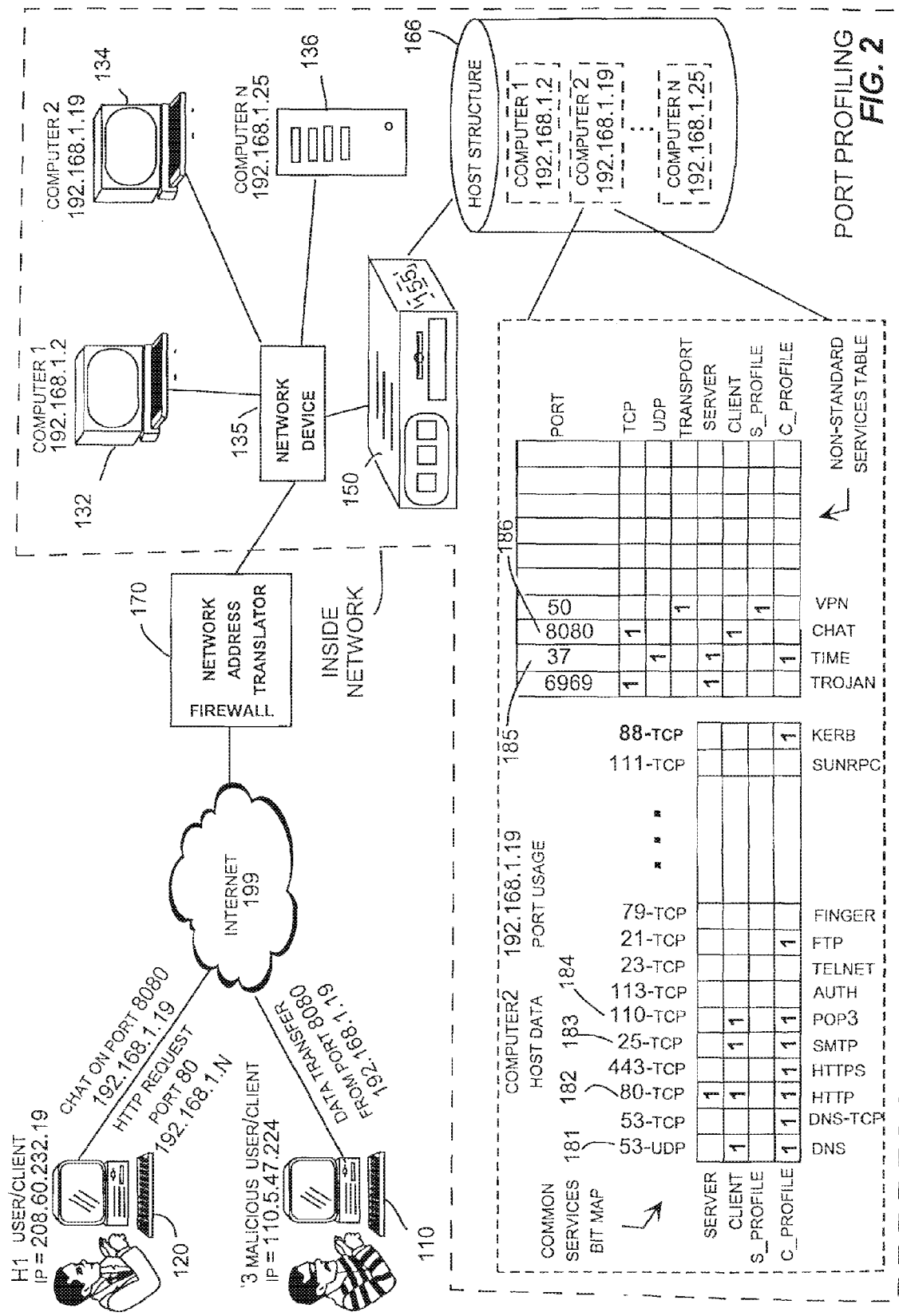
FIG. 2 is a functional block diagram illustrating the operation of an exemplary port profiling system.

FIG. 2 illustrates port profiling of the host computers on an "inside" network. A network device 135 such as a switch, token ring hub, router, or the like connects a plurality of "inside" hosts 132, 134, 136 on the inside network such as a local area network (LAN), wide area network (WAN), or the like. The network monitoring appliance 150 connects to the network device 135 in a known manner such that the monitoring device 150 can scan all the packets 101 that get delivered to or sent from each host 132, 134, 136 on the internal network.

In accordance with an aspect of the invention, the port profiling engine 155 works by assigning data packets 101 to various flows. The port profiling engine 155 analyzes the flow data to distinguish legitimate flows from probes. A legitimate flow is a communication in which data is sent by TCP and acknowledged, by UDP packets that are not rejected, or a local multicast or broadcast flow.

Legitimate data flows (as differentiated from "probes") are observed to take place between two hosts, one generally identifiable as acting as the "client" and the other host acting as the "server". Only the server's TCP or UDP port number is used to identify the network service because the server port is normally indicative of the network service being used by the two hosts. Typically, a host computer will act either as a client or a server. Normally, severs are set up to respond from requests initiated by clients, while client machines initiate the requests. Of course, a host can be configured to operate as both a client and a server.

The port profiling engine 155 determines unauthorized network usage by comparing observed current network services with a stored profile of allowed network services for a particular host. The port profiling engine 155 updates a host structure 166 upon observance of a network service by that host. The host data structure 166 stores "seen today" information about all observed hosts, and maintains a port profile of allowable network services for "inside" hosts. Port profiling entails keeping two lists for each of the hosts:

1) a profile list by Protocol and Port Number (0 to 65,535) (for TCP and UDP), and simply by Protocol (number) for other Transport Layer protocols, and type of operation (as a Client or Server) for all allowed operations (the "Port Profile"); and 2) a corresponding "seen today" list of what operations have been seen today.

As illustrated in reference to FIG. 2, the host data structure includes a bit map that stores data for the 32 most commonly seen network services and a table capable of storing data for additional network services for each IP address. Because most hosts only utilize a relatively small number of services, the host data structure includes 32 of the most commonly seen services in the predefined bit maps for each host in order to save on data storage space. In order to track other possible services, a table is appended that can list up to ten (as illustrated) additional services for each IP address. As described below, other transport layer protocols observed are also included among the ten additional services in the port profile.

Figure 4:
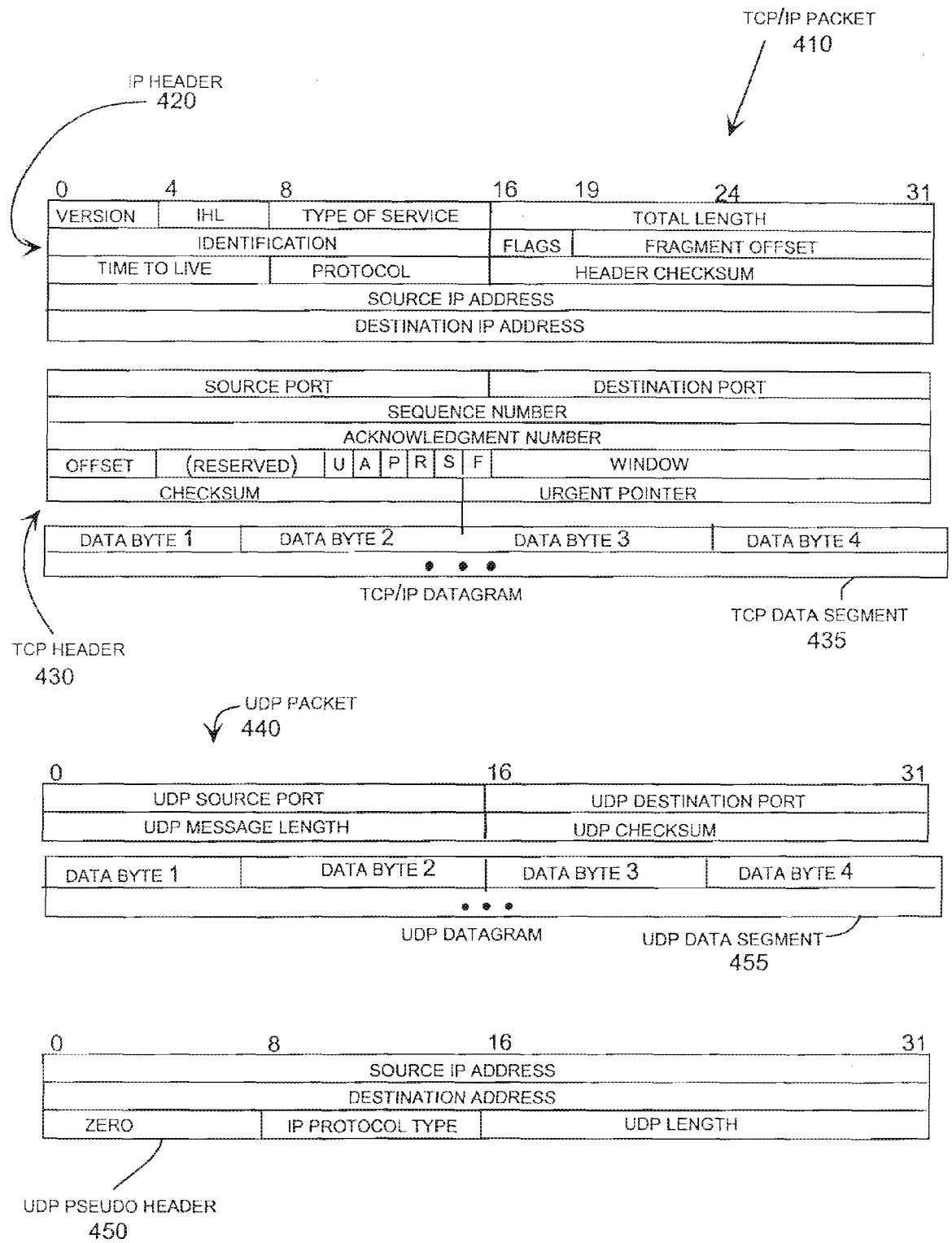
FIG. 4 is a diagram illustrating headers of datagrams.

As described in reference to FIG. 4, there are 251 other protocols that can be designated by the "next protocol" field in the IP header besides the three common Internet Transport Layer protocols (ICMP, TCP, and UDP). There are generally no port numbers with these other protocols, so these other protocols are indicated simply by the "protocol number." The Internet Control Message Protocol (ICMP), referred to as protocol number 1, is not tracked because every host using IP would be using ICMP. The host using these protocols are all shown as "servers" since many of the protocols are peer-to-peer and the transport protocol number indicates the service.

Once the port profile is accurate, the port profiling engine 155 compares the two lists to detect operations that are "Out of Profile" and provide an alarm to the system operator. An Out of Profile operation can indicate the operation of a Trojan Horse program on the host or the existence of a non-approved network application that has been installed.

The generation of a profile of the allowable services for each host can be a trying task for network administrators. Therefore, the network service profile can be automatically generated. The port profiling engine 155 can generate the allowable networks services profile by updating the profile with the used network services as described below.

Automatic Configuration of Host Port Profiles

Initially a network administrator may not know all the client and server applications that are running on their network. The system is able to operate in different modes that permit the initial port profile to be built up automatically. The update is accomplished in modes. The first mode is initial service usage collection. The second mode displays new services and the services are automatically updated in the profile. In mode three, new services are not automatically added to the host profile, but no alarm is generated by the port profiling engine 155. In mode four, an alarm is generated for each network service used that is not in that host's profile.

Mode 1. The port profile "Points" [host IP address, protocol (TCP or UDP or Transport Layer number), port (for TCP and UDP), and Server or Client] are added to the profile as they are observed.

Mode 2. Like Mode 1, except a list of hosts with new profile Points is displayed as they are observed each time period. The new Points are automatically added to the port profile at the end of the time period.

Mode 3. Like Mode 2, except the new Points are not added to the port profile at the end of the time period.

Mode 4. Like Mode 3, except an alarm (by email, email to beeper, or SNMP Trap packet) is issued as soon as an Out of Profile operation is observed.

A new installation might run in Mode 1 for a week to accumulate Points associated with the various services commonly utilized by various hosts on the "inside" network. Then the system is shifted to Mode 2. The port profile is inspected to make sure no undesired Points are in the profile at this time. Each day in Mode 2 the new Points are inspected to make sure they meet the organization's network usage policy since they are added automatically. When most of the existing port profile Points seem to have been collected, the system can shift to Mode 3 and then to Mode 4, or go directly to Mode 4. Any Point outside of the profile will generate an alarm while operating in Mode 4. A manual editor can modify the port profile Points as deemed necessary.

Manual Profile Editor

In accordance with another aspect of the invention, the profile editor lets port profile Points be added or deleted by the network administrator. If an unwanted port profile Point was added during the automatic configuration, it can be removed (e.g., if a Trojan Horse was discovered and removed from a host). It also allows blocks of IP addresses to have the same port profile Point data (TCP or UDP port, Server or Client) added or deleted in a single operation. For example a range of IP addresses might be assigned by DHCP to visitors with laptops. Standard profiles could be assigned to the whole block (Web, Email Clients, no Servers) even though not all of the IP addresses were seen during the automatic configuration.

Port Profiling Operation Example

As illustrated in FIG. 2, computer#2 134 is an inside host computer whose communications are being monitored by a network monitoring appliance 150 connected to a switch 135. The communications sent to and received from computer#2 134 IP address 192.168.1.25.

As previously discussed, a port profile has been generated for computer#2. The host data port usage shows that computer#2 134 in its normal operations acts as a client as shown by the C_PROFILE structure. The port profile for the host 134 indicates that the host 134 is authorized or historically has acted as a client for the DNS, HTTP, HTTPS, SMTP, POP3, and FTP services. However, as illustrated, the host 134 has not utilized either the File Transfer Protocol or the Kerberos protocol in the last 24 hours.

The example illustrated in FIG. 2 shows four authorized activities network services that have been seen today or used today. In the example, the authorized four services used today are activities utilizing HTTP, UDP, POP, SMTP as a client.

Figure 5:
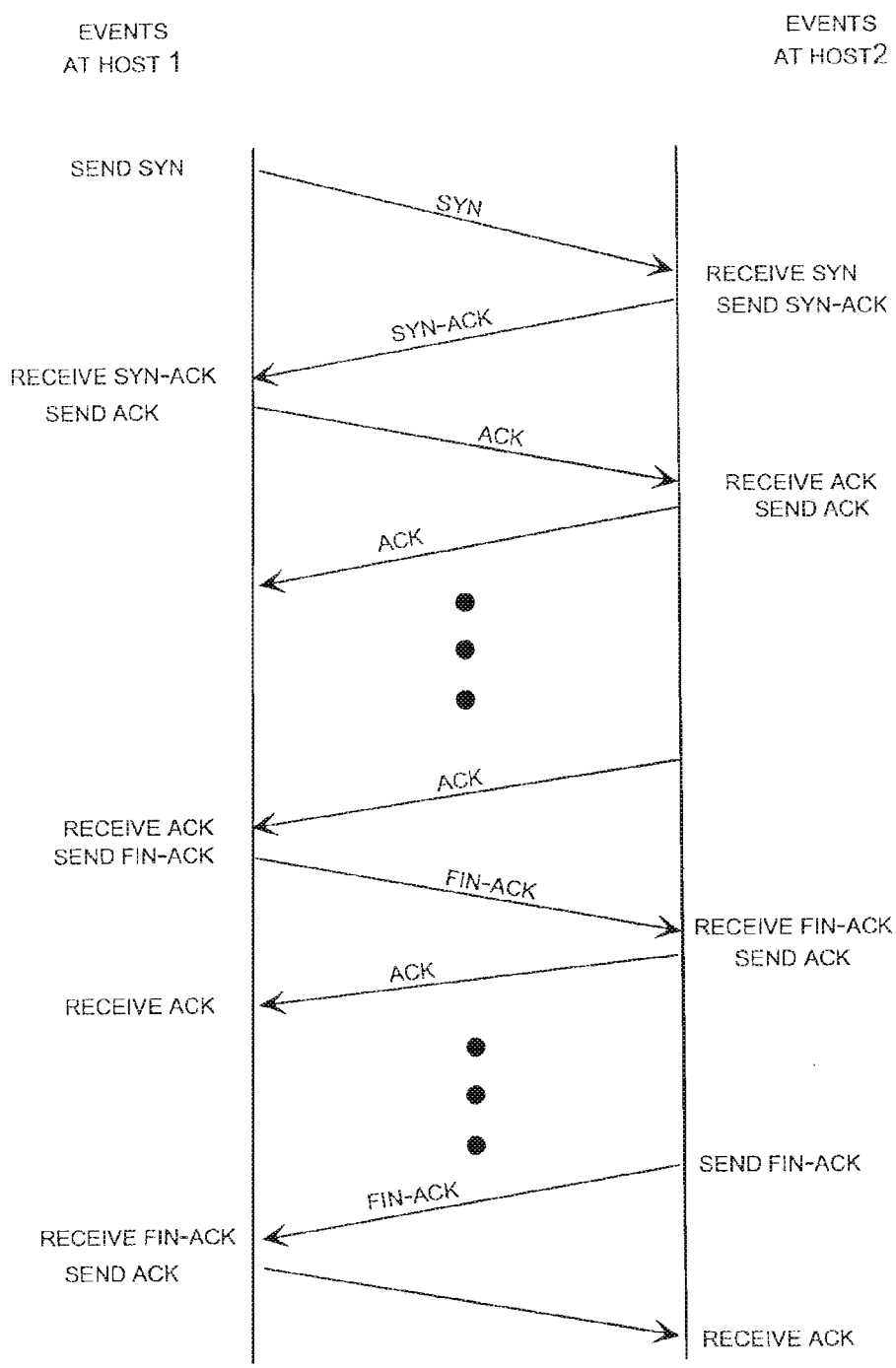
FIG. 5 is a functional block diagram illustrating an exemplary normal TCP communication.

When acting as a client accessing the world wide web, the host 134 opens an ephemeral high number port, as shown in reference to FIG. 5, when initiating HTTP communications and sends the communications to port 80 at the IP address of the server receiving the request. The port profiling engine then indicates on the "seen today" data structure ("CLIENT") that host 134 acted as a client on port 80 utilizing the HTTP service. No alarm is generated because the client port profile for host 134 (C_Profile) list port 80 as an accepted network service. This service is shown by the 80-TCP Point 182. As anticipated, the communication utilized the DNS service on UDP port 53. Consequently, the "seen today" structure is also indicates this Point as being utilized shown by 53-UDP Point 181. Again, because this Point (53-UDP) is listed in the C_Profile structure, no alarm is generated.

In addition, computer#2 134 has requested to view email stored on an email server. The request is sent to port 110 of the email server, which corresponds to the POP3 service. The host 134 acts as a client when requesting to view its email. Similarly, computer 2 134 has sent an email to another host utilizing Simple Mail Transport Protocol (SMTP). Consequently, port profile engine 155 indicates on the "seen today" client structure (CLIENT) that Point 110 (POP3 service) 184 and Point 25 (SMTP service) 183 has been utilized as a client. Likewise, since client Points 110 and 25 are listed in the C_Profile structure for that host 134, no alarm is generated.

For purposes of discussion, assume that the clock for Computer#2 134 drifts. The clock can be updated to reflect the current time by requesting the time service on port 37 of a time server. Time is not defined as one of the 32 commonly seen services. Consequently, the port profiling engine updates the appended table with the applicable port (37) and the Transport Layer protocol (UDP) as shown by port 37 Point 185 in the table. If time service was not in profile for the host, an alarm would be generated. After reviewing the alarm, message, the system administrator could use the manual port editor and add the Point 37 to the C_Profile. As illustrated, Point 37 has been included in the port profile for Computer 2 134, which will prevent further alarms from that host using the time service.

Continuing the example, the inside network utilizes a virtual private network (VPN) on port 50. Consequently significant traffic is communicated on a proprietary Transport Layer protocol to port 50. Since this service is not one of the defined common services, the port profiling engine tracks the port and Transport Layer protocol in the appended table of the host structure.

Extending the example, software facilitating instant messaging or "chat" has been installed in Computer#2 134. Computer#2 134 sends chat messages to H2 120 on port 8080 at IP address 208.60.232.19. This chat service is also not one of the defined common services and is tracked in the table of non-standard services. Although computer#2 initiated the service and is acting like a client, the service is not in the C_Profile for Computer#2 134 as shown by UDP-8080 Point 186. Consequently, an alarm is generated. The system operator can remove the installed chat program, if desired, or take other appropriate action.

Likewise, Computer#2 134 has installed an authorized web page. When the web page is accessed, the host 134 is now acting like a server. The port usage as shown in the S_Profile for Computer#2 134 does not include port 80 as a server i.e. no bit is set in the 80-TCP column of the S_Profile. Consequently, an alarm will be generated. The system administrator can remove the unauthorized web page that may be monopolizing valuable band width.

Not all unauthorized usage is non-malicious in nature. Despite firewalls and intrusion detection systems, a Trojan Horse may still get installed on a network. Many Trojan Horse applications listen for a request emanating from another computer (H3 in this example) on a pre-selected, normally unused, port. When a communication is directed to the pre-selected port, the Trojan Horse responds by uploading information to the requesting address indicated in a received packet. Assume in FIG. 2, H3 has installed a Trojan Horse on Computer#2 134. Upon receiving a request from IP address 110.5.47.224, the application begins sending data from port 6969. Computer#2 is acting as a server on port 6969. This service is out of profile for this host 134. An alarm is generated and appropriate action can be taken.

The port profiling engine generates an alarm for all out of profile services utilized by a host. If a service is in profile, the port profiling engine determines if host was accessed from an unauthorized zone. Zone locking is a method of monitoring utilization of authorized network services from unauthorized hosts. Zone locking is discussed in detail in reference to FIG. 3.

Zone Locking

Figure 3:
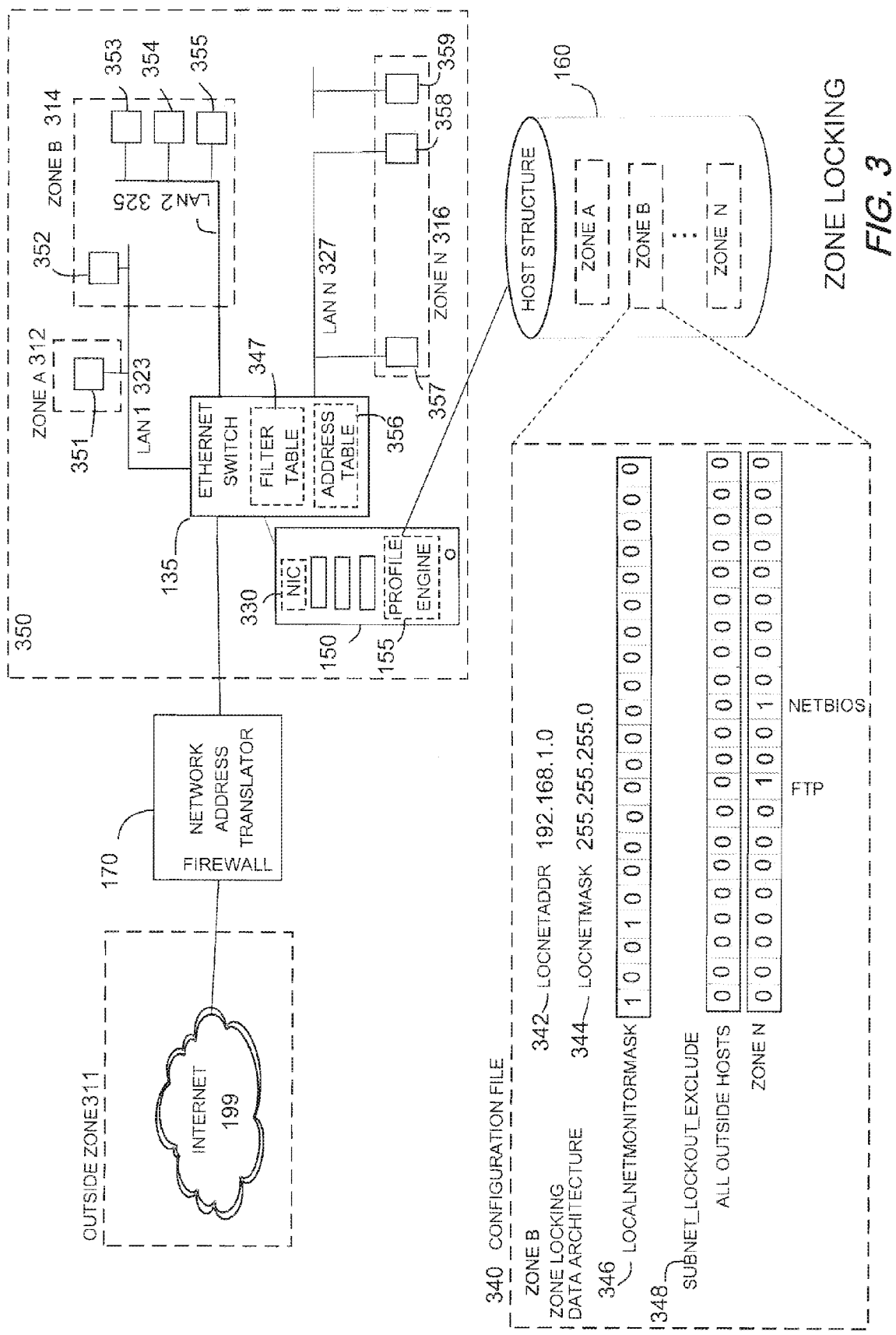
FIG. 3 is a functional block diagram of an exemplary zone locking system.

Turning to FIG. 3, illustrated is an exemplary zone locking system. Multiple local area network (LANs) segments 323, 325, 327 are connected in a known manner by a multiple port bridge 135 such as an Ethernet switch. Typically, a LAN operates behind a firewall 170. The hosts that operate inside the firewall 170 are referred to as "inside hosts." Firewalls are typically designed to filter network traffic based on attributes such as source or destination addresses, port numbers, or transport layer protocols. Illustrated is a known Network Address Translator (NAT) gateway 170 with built in network routing capability. Of course, those skilled in the art will appreciate that the port profiling engine 155 or monitoring appliance 150 can operate with or without the existence of any firewalls 170.

As illustrated in an exemplary system, all internal network traffic flows through the Ethernet switch 135, and consequently, for this example, this device would be a logical interface for a network monitoring appliance 150 to effectuate zone locking. An Ethernet switch 135 is a LAN interconnection device that operates at the data link layer. A network interface card 330 is used to connect a host to an Ethernet network 350. In an Ethernet network 350, frames of data are formed using a protocol called Medium Access Control (MAC). Ethernet frames encapsulate other network protocols such as IP.

In the present example, the port profiling engine 155 flow detector thread 710 (discussed in detail with reference to FIG. 7) determines the source and destination hardware addresses, referred to as MAC addresses in an Ethernet network 350, for each frame. This hardware address information is stored in the flow data structure 162 referenced in FIG. 1.

The bridge 135 forwards frames from one LAN such as LAN #1 323 to another LAN such as LAN #2 325 or LAN #N 327. Clearly, a bridge 135, such as a hub or a repeater, could forward all received frames out of all the interfaces (ports) resulting in the frame reaching all connected equipment. However, it is more efficient for the bridge 135 to only forward a frame, if necessary, to the LAN segment containing the device for which the frame is intended. By examining the MAC source address of each received frame, and recording the port on which it was received, a switch 135 may learn which address belong to hosts connected via each port.

The learned hardware addresses are stored in an interface address table 356. In some bridges 135, a system administrator may override the standard forwarding by inserting entries in a filter table 347. The switch 135 utilizes the filter table 347 in a known manner to inhibit the forwarding of frames between particular sets of MAC addresses. The filter table 347 contains a list of source or destination addresses. Frames which match the entries in the filter table will only be forwarded to specific configured hosts.

As previously discussed, the port profiling engine 155 monitors all the available communications of a network. The port profiling engine 155 identifies the hosts and categorizes the hosts into zones. As illustrated, the hosts are divided into zone A 312, zone B 314, and zone N 316. These zones can be functional zones like engineering, accounting, or the like. Alternatively, the zones can be subnets such as subnets dedicated to web servers or other applications. An alarm is generated immediately upon communications between zones that are not authorized. Consequently, zone locking enables an inside the firewall policy management.

Figure 7:
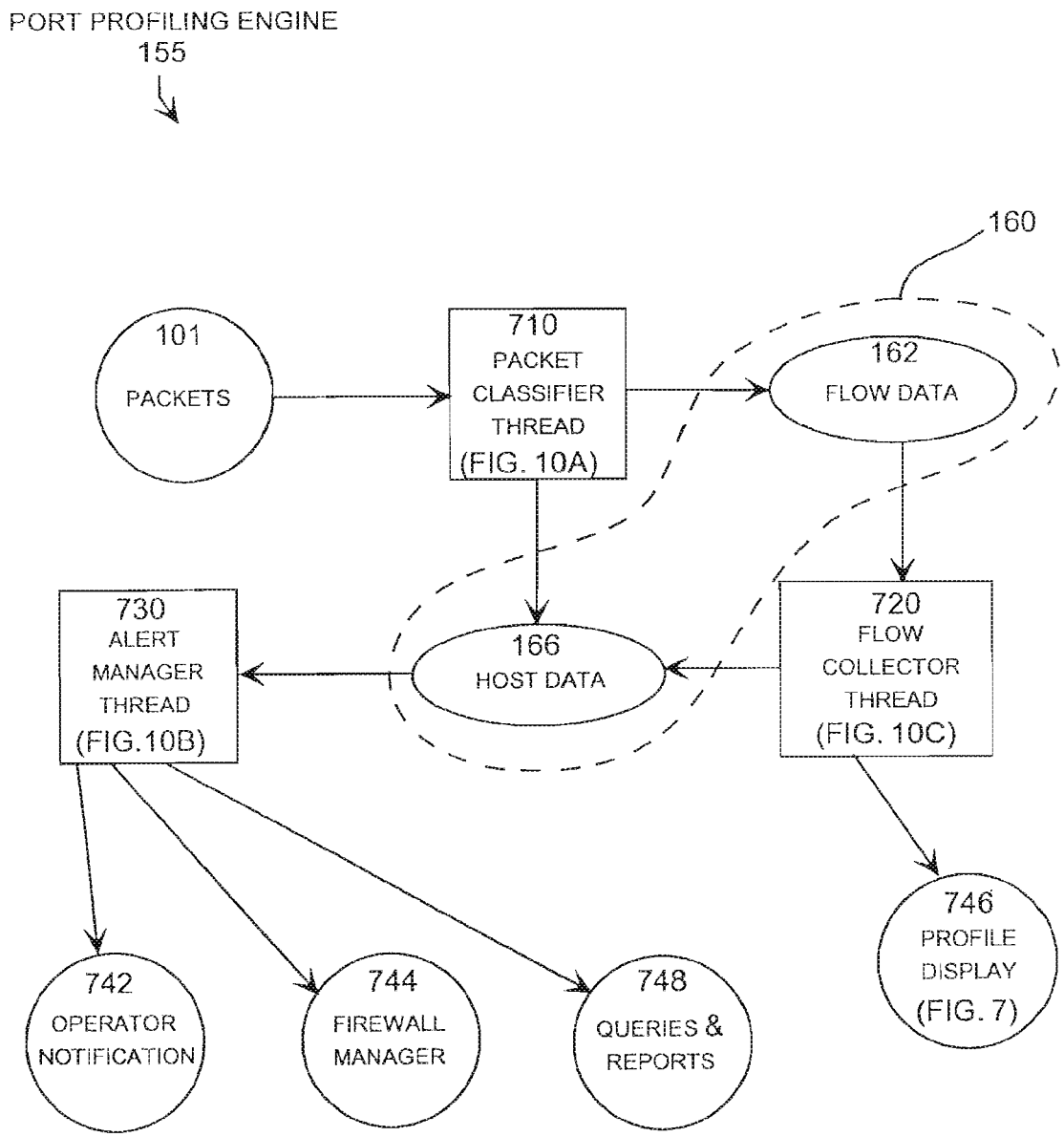
FIG. 7 is a functional block illustrating a port profiling engine.

As discussed in greater detail in reference to FIG. 7, flow data collection provides immediate identification of which hosts are acting as a client, a server, and which service that is being utilized. The port profiling engine 155 provides instant notification when hosts in a zone communicate to other zones using an unauthorized service. Zone locking imparts the ability to determine which services a host is authorized to perform when communicating with other zones. Each designated zone has predefined unauthorized zones that are not allowed to attempt to connect to that designated zone as a client. However, particular services can be exempted from the general zone lockout. Consequently, if any unauthorized zone for a particular zone attempts to connect as a client to a sever in the particular zone, an alarm will be generated unless that service is excluded from the zone lockout.

As previously discussed, the profiling engine 155 determines if a host is performing a service allowed by its profile. If a service is allowed, the profile engine 155 checks a local network monitor mask bitmap 346 to determine if the service originator is a client from an unauthorized zone. If the communication originated from an unauthorized zone, the engine 155 checks a subnet lockout exclude array 348 to determine if that particular service is excluded from the zone lockout. If the service is excluded from the zone lockout, no alarm is generated.

As illustrated in FIG. 3, the described network 350 has three defined zones. Zone A 312 has a single host 351 that resides on the same collision domain 323 as host 352. Zone B consist of host 352 on LAN segment #1 323 and hosts 353-353 on LAN segment #2 325. Hosts 357-359 all reside on the same collision domain, LAN segment #N 327.

Figure 11:
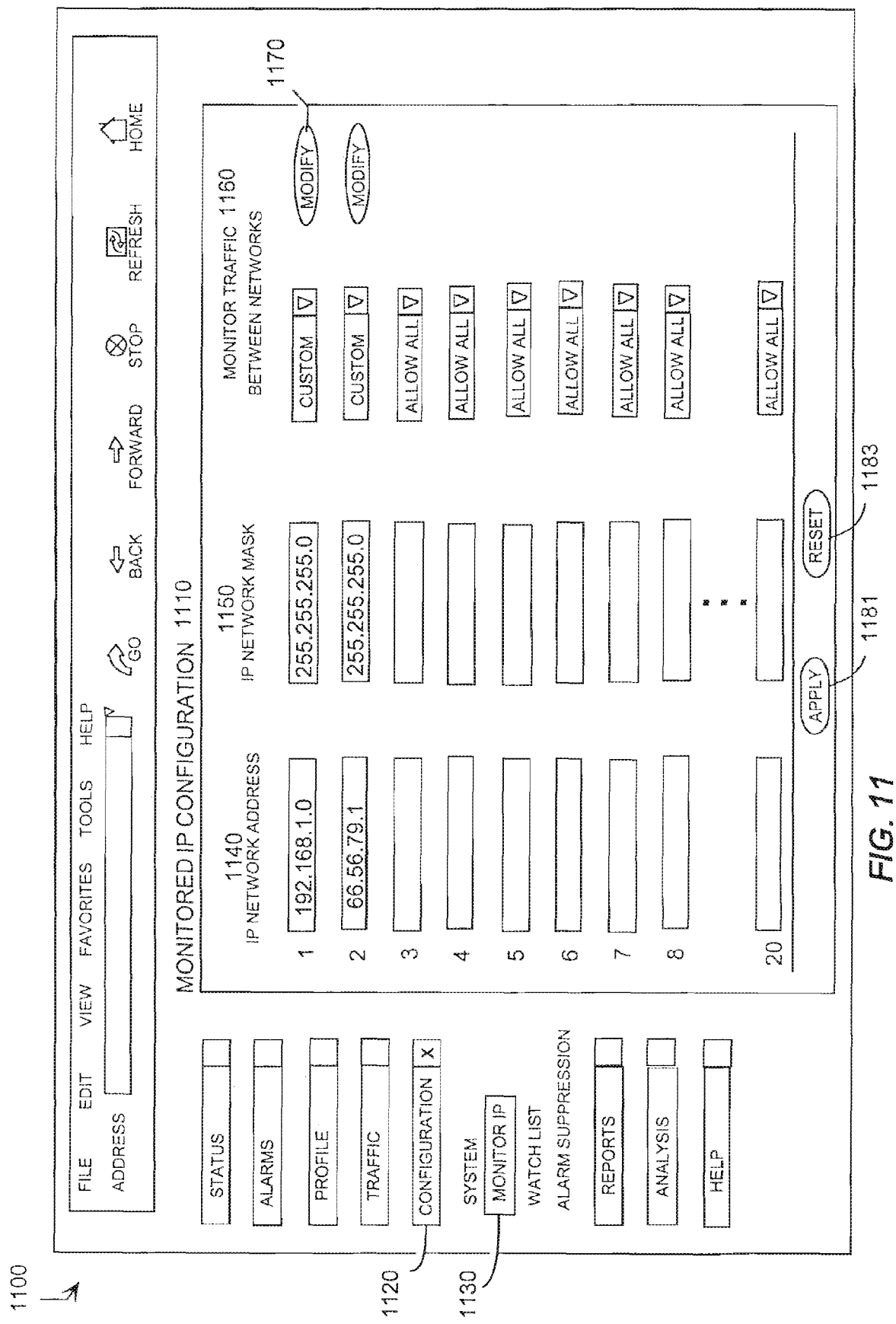
FIG. 11 is an exemplary screen shot of a monitored IP configuration.

The port profile engine 155 stores in a host structure 160 the zone locking data 340 for each zone. As shown, Zone B 314 has been assigned in a known manner the subnet IP address 192.168.1.0 (locnetaddr) 342 with a corresponding subnet mask 255.255.255.0 (locnetmask) 344. FIG. 11 illustrates an exemplary input screen for specifying the zones for which zone locking is applicable.

The zone locking data architecture 340 has a defined bitmap to specify the unauthorized or locked zones. The localnetmonitormask 346 is a bitmap that defines which zones are unauthorized to access the zone B hosts 353-355 as a server. The first bit of the localnetmonitormask bitmap 346 is defined as all outside hosts. As shown, the first bit is set indicating that any outside host of the firewall attempting to initiate contact is unauthorized.

The next 20 bits indicate which inside zones 312, 314, 316 are zone locked from initiating contact with zone B 314. The localnetmonitormask bitmap 346 can contain more than 21 bits if the inside network 350 contains more than 20 inside zones (the first bit has been defined as outside zones).

As illustrated, bit two is not set. Consequently, zone A 312 is not locked from acting as a client to the hosts 353-355 in zone B 325. Likewise, bit three is not set and hosts within zone B are not prohibited from acting as a client to other hosts within zone B. However, bit four is set indicating zone N 327 is zone locked. Consequently, any communication in which hosts 357-359 attempt to communicate as a client to the hosts 353-355 of zone B may trigger an alarm. The other bits of the localnetmonitormask bitmap 346 are available for additional zones. An exemplary input screen for setting the locked zone is illustrated in reference to FIG. 12.

Even though a locked zone is generally prohibited from initiating communications with a particular zone, particular services originating from the locked zone may be authorized and excluded from the zone lock. The zone locking data architecture 340 includes an array for each zone or subnet that specifies which services are excluded from each locked zone. The subnet_lockout_exclude array 348 illustrates an example this exclusion override.

As discussed, two of the zones illustrated in reference to FIG. 3 are specified as locked zones for initiating contact with zone B. The zone lock for all outside client hosts has been set as shown by the first bit of localnetmonitormask bitmap 346. However, as illustrated by the subnet_lockout_exclude array 348, no service override bits have been set for the outside zone 311. Consequently, no communications initiated from outside hosts are authorized to be received by a host in zone B. The other illustrated blocked zone, zone N 316, has bits set in the subnet_lockout_exclude array 348 to exclude from zone blocking the NetBios service and FTP service. Consequently, host 357-359 from zone N 316 may initiate NetBios or FTP communications with hosts 352-355 of zone B.

Naturally, the zone blocking method can be accomplished by multiple monitoring devices 150 operating in a distributive manner throughout a network. Each LAN 350 can have its own monitoring appliance 150 reporting data to a master server. The master server can provide the alarms for violations of the zone blocking policies.

It will now be appreciated that the disclosed methodology of unauthorized network usage detection is accomplished at least in part by comparing a predetermined port profile for a host against that host's recent activity. In addition, zones can be excluded from initiating communications with other zones. The addresses and port numbers of communications are easily discerned by analysis of the header information in a datagram.

Packet

Referring now to FIG. 4, and inasmuch as an understanding of Internet data packets is helpful for constructing embodiments of the present invention, a description of such packets, also called "datagrams", will next be provided as an aid to understanding. A packet or datagram 101 is a self-contained, independent entity or unit of data carrying sufficient information to be routed from a source to a destination computer without reliance on earlier exchanges between the source and destination computer. Packets 101 have a header and a data segment as illustrated by FIG. 4. The term "packet" in present-day parlance has generally replaced the term "datagram".

Restated, a packet 101 is the unit of data that is routed between an origin and destination on a packet-switched network such as the Internet 199. A packet-switching scheme is an efficient method of handling transmissions on a connectionless network. However, connection-oriented protocols can be utilized to create a session. A session is a series of interactions between two communication end Points that occur during the span of a single connection. A detailed discussion of a TCP/IP session is described in reference to FIG. 4. However, a host can send a message without establishing a connection with the recipient. That is, the host simply sends a packet 101 onto the network 199 with the destination address and hopes that the packet arrives.

FIG. 4 illustrates an exemplary TCP/IP packet or datagram 410 and an exemplary UDP datagram 440. In a typical TCP/IP packet like 410, each packet typically includes a header portion comprising an IP header 420 and a TCP header 430, followed by a data portion that contains the information to be communicated in the packet. The information in the IP header 420 contained in a TCP/IP packet 410, or any other IP packet, contains the IP addresses and assures that the packet is delivered to the right host. The transport layer protocol (TCP) header follows the Internet protocol header and specifies the port numbers for the associated service.

The header portion in the typical TCP/IP datagram 410 is 40 bytes including 20 bytes of IP header 420 information and 20 bytes of TCP header 430 information. The data portion or segment associated with the packet 410 follows the header information.

In regards to a typical IP packet 410, the first 4 bits of the IP header 420 identify the Internet protocol (IP) version. The following 4 bits identify the IP header length in 32 bit words. The next 8 bits differentiate the type of service by describing how the packet should be handled in transit. The following 16 bits convey the total packet length.

Large packets tend to be fragmented by networks that cannot handle a large packet size. A 16-bit packet identification is used to reassemble fragmented packets. Three one-bit set of fragmentation flags control whether a packet is or may be fragmented. The 13-bit fragment offset is a sequence number for the 4-byte words in the packet when reassembled. In a series of fragments, the first offset will be zero.

After the fragmentation information, an 8-bit time to live field specifies the remaining life of a packet and is decremented each time the packet is relayed. If this field is 0, the packet is destroyed. Next is an 8-bit protocol field that specifies the transport protocol used in the data portion. The following 16-bit field is a header checksum on the header only.

Finally, the last two fields illustrated contain the 32-bit source address and 32-bit destination address. IP packet data follows the address information.

In a TCP/IP datagram 410, the initial data of the IP datagram is the TCP header 430 information. The initial TCP header 430 information includes the 16-bit source and 16-bit destination port numbers. A 32-bit sequence number for the data in the packet follows the port numbers. Following the sequence number is a 32-bit acknowledgement number. If an ACK flag (discussed below) is set, this number is the next sequence number the sender of the packet expects to receive. Next is a 4-bit data offset, which is the number of 32-bit words in the TCP header. A 6-bit reserved field follows.

Following the reserved field, the next 6 bits are a series of one-bit flags, shown in FIG. 4 as flags U, A, P, R, S, F. The first flag is the urgent flag (U). If the U flag is set, it indicates that the urgent Pointer is valid and Points to urgent data that should be acted upon as soon as possible. The next flag is the A (or ACK or "acknowledgment") flag. The ACK flag indicates that an acknowledgment number is valid, and acknowledges that data has been received. The next flag, the push (P) flag, tells the receiving end to push all buffered data to the receiving application. The reset (R) flag is the following flag, which terminates both ends of the TCP connection. Next, the S (or SYN for "synchronize") flag is set in the initial packet of a TCP connection where both ends have to synchronize their TCP buffers. Following the SYN flag is the F (for FIN or "finish") flag. This flag signifies that the sending end of the communication and the host will not send any more data but still may acknowledge data that is received.

Following the TCP flag bits is a 16-bit receive window size field that specifies the amount of space available in the receive buffer for the TCP connection. The checksum of the TCP header is a 16-bit field. Following the checksum is a 16 bit urgent Pointer that Points to the urgent data. The TCP/IP datagram data follows the TCP header.

Still referring to FIG. 4, a typical User Datagram Protocol (UDP) packet 440 provides a procedure for application programs to send messages to other programs with a minimal of protocol mechanisms. The IP protocol previously described is used as the underlying protocol. The UDP protocol is transaction oriented and delivery protection is not guaranteed. Applications requiring reliable delivery of data typically use the previously described Transmission Control Protocol (TCP).

The 16-bit UDP source port is a field to which port a reply, when meaningful, should be addressed. The 16-bit UDP destination port specifies the server program on the receiving host to execute the packet. Next, the 16-bit UDP message length field is the length in bytes of the user datagram including header and any data. Following the length field is the 16-bit checksum of the UDP header, the UDP pseudo header information 450 from an IP header 420, and the data.

As will be understood by those skilled in the art, the fundamental Internet service consists of a packet delivery system. Internet service is typically considered "connectionless" because each packet is treated independently of all others. Some transport protocols such as UDP provide unreliable service because the delivery of the packet is not guaranteed. Other transport protocols such as TCP provide a mechanism to ensure delivery of a packet and therefore can be used to establish computer-to-computer "sessions" in the conventional sense of the term. FIG. 5 illustrates a typical TCP/IP session and the guaranteed packet delivery mechanism.

As previously stated, the port profiling engine 155 does not analyze the data segments of packets for signature identification. Instead, the engine 155 associates all packets with a flow.

It analyzes certain statistical data and tracks the associated network services. The engine 155 compares recent activity to a predetermined port profile. An alarm is generated when a host uses a service that is not in its port profile or initiated from an unauthorized zone.

However, in the exemplary embodiment, the port profiling engine only analyzes legitimate flows for unauthorized network usage in order to minimize generated alarms. In a legitimate flow, some data is transmitted and acknowledged. A discussion of TCP/IP flows follows to further illustrate legitimate flows.

Legitimate Flow

Turning next to FIG. 5, a TCP session 500 is a full duplex connection that allows concurrent transfer of data in both directions. Before the transfer can start, both the sending and receiving application programs interact with their respective operating systems, informing them of the impending stream transfer. Protocol software communicates by sending messages across, verifying that the transfer is authorized, and indicating that both sides are ready to receive data.

FIG. 5 illustrates an exemplary TCP/IP session 500. As discussed in reference to FIG. 4, the SYN flag is set whenever one host initiates a session with another host. In the initial packet, host1 sends a message with only the SYN flag set. The SYN flag is designed to establish a TCP connection and allow both ends to synchronize their TCP buffers. Host1 provides the sequence of the first data packet it will send.

Host2 responds with a SYN-ACK packet. In this message, both the SYN flag and the ACK flag is set. Host2 provides the initial sequence number for its data to Host1. Host2 also sends to Host1 the acknowledgment number which is the next sequence number Host2 expects to receive from host 1. In the SYN-ACK packet sent by Host 2, the acknowledgment number is the initial sequence number of Host 1 plus 1, which should be the next sequence number received.

Host 1 responds to the SYN-ACK with a packet with just the ACK flag set. Host 1 acknowledges that the next packet of information received from Host 2 will be Host 2's initial sequence number plus 1. The three-way handshake is complete and data is transferred. Only communications in which data is transferred is considered a legitimate communication. If no data is transferred, the communication is considered a probe.

Host2 responds to ACK packet with its own ACK packet. Host2 acknowledges the data it has received from Host1 by sending an acknowledgment number one greater than its last received data sequence number. Both hosts send packets with the ACK flag set until the session is to end although the P and U flags may also be set, if warranted.

As illustrated, when host1 terminates its end of the session, it sends a packet with the FIN and ACK flags set. The FIN flag informs Host2 that no more data will be sent by Host1. The ACK flag acknowledges the last data received by Host1 by informing Host2 of the next sequence number it expects to receive.

Host2 acknowledges the FIN packet by sending its own ACK packet. The ACK packet has the acknowledgement number one greater than the sequence number of Host1's FIN-ACK packet. ACK packets are still delivered between the two hosts, except that HOST1's packets have no data appended to the TCP/IP end of the headers.

When Host 2 is ready to terminate the session, it sends its own packet with the FIN and ACK flags set. Host1 responds that it has received the final packet with an ACK packet providing to Host2 an acknowledgment number one greater than the sequence number provided in the FIN-ACK packet of Host2.

Alternatively, a host may desire to keep a session active even after if has finished sending its current data. If more data is to be sent in the near future, it is more efficient to keep a session open than it is to open multiple sessions. A session wherein the connection is kept open in case future data is to be communicated is typically referred to as a "persistent" session. In this scenario, a session is closed by sending a packet with the reset flag (R) set (also called a "reset packet") after no data is delivered after a period of time. Many browser applications provide a 300-second window of inactivity before closing a session with an R packet (reset).

The described TCP session 500 of FIG. 5 is a generic TCP session in which a network might engage. In accordance with the invention, flow data is collected about the session to help determine if the communication is abnormal. In the preferred embodiment, information such as the total number of packets sent, the total amount of data sent, the session start time and duration the TCP flags set in all of the packets, and MAC frame addresses encapsulating the IP packets are collected, stored in the database 160 and analyzed.

As example of a non-legitimate flow, a TCP/IP packet with both the SYN flag and the FIN flag set would not exist in a normal communication. Because a packet with both the SYN and FIN flags set is undefined, each operating system handles this packet in different methods. An operating system may send an ICMP message, a reset, or possibly just ignore it and send nothing. Consequently, an intruder may send a SYN-FIN packet specifically to help identify the operating system of the targeted host.

As another example, if a particular host sends a large number of SYN packets to a target host and in response receives numerous R packets from the targeted host, a potential TCP probe is indicated. Likewise, numerous UDP packets sent from one host to a targeted host and numerous ICMP "port unavailable" packets received from the targeted host indicates a potential UDP probe. A stealth probe is indicated by multiple packets from the same source port number sent to different port numbers on a targeted host.

As has been described elsewhere, UDP packets are often used in connection with streaming media and other applications that provide data to many hosts. A UDP packet with no appended data does not occur in normal communications. In fact, a flow with numerous SYN packets with numerous SYN-ACK responses may indicate a half-open attack designed to tie up the targeted host's ports and resources. From the foregoing, it will be understood and appreciated that an analysis of legitimate flows will not include flows without some data transfer.

Network Services

A single network service is typically associated with a particular port on a server, and is also associated with a port on a client machine; port numbers are typically fixed in server machines such as host #2 server 130 (FIG. 1) but typically vary in client machines such as host#1 client 110. However, the port profiling engine 155 associates in the host data structure 166 both the client host and the server host with the server port number because that port generally represents the network service being utilized.

Figure 6:
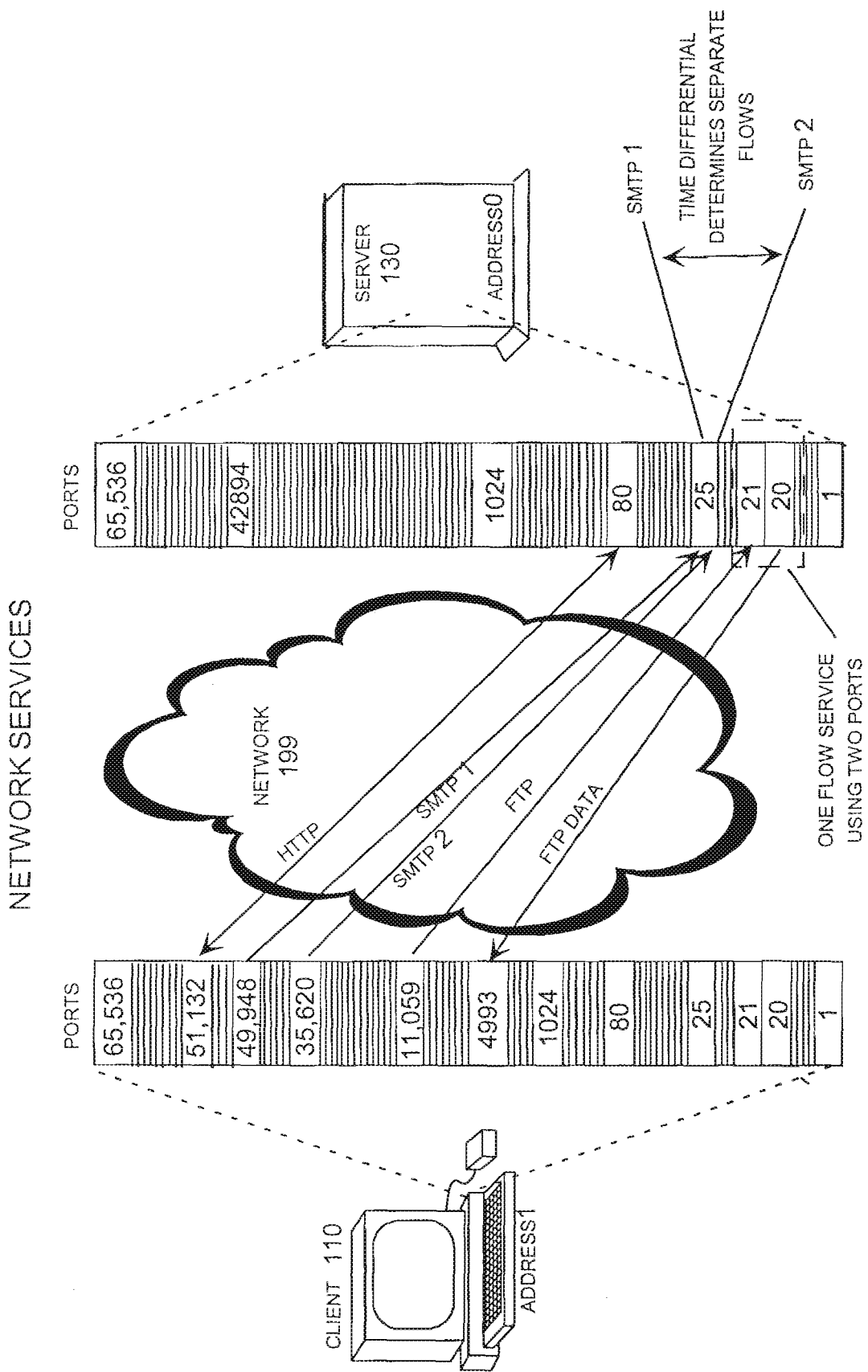
FIG. 6 is a functional block diagram illustrating the operation of network services.

FIG. 6 is an illustration of some common flows associate with some common network services. As is known, each host has its own unique IP address. IP addresses are typically referred to by four sets of numbers separated by periods, e.g. N.N.N.N, where N varies between 0 and 255. Also as described, assigned port numbers of the server delineate the services provided by that server; port numbers in present-day systems vary between 0 and 65,536.

The client is illustrated with an IP address of ADDRESS1 while the server is illustrated with IP address ADDRESS0. As illustrated in the example, three separate services—HTTP, SMTP, and FTP—are being invoked by the client. A Web browser application (not shown) running on the client machine utilizes the Hypertext Transfer Protocol (HTTP), an email application (also not shown) utilizes the Simple Mail Transfer Protocol (SMTP), and a file transfer application program (not shown) utilizes the File Transfer Protocol (FTP).

The first flow illustrated would be Web traffic (HTTP protocol) between the client at IP ADDRESS1 and the server at IP ADDRESS0. The client Web browser opens a random ephemeral high port (51,132) as illustrated in the example. A high port is utilized because the low port numbers less than 1024 are preassigned and well known for designated services.

One these well known designated services is port 80 for HTTP, which transfers displayable Web pages and related files in the known manner. The Web browser sends the request to the server's port 80. The server port responds by sending the requested Web page data in packets wherein the port number in the packets transmitted to the client sets the destination port to 51,132 of the client. All communications by clients utilizing HTTP is sent to port 80 of the server. One flow would be the HTTP communications between port 51,132 of ADDRESS1 and port 80 of ADDRESS0. However, the port profiling engine will update ADDRESS1 as a client utilizing port 80 and ADDRESS0 as the server utilizing port 80 in the "seen today" structure. The port profiling engine compares the port profile of each host with the current activity for that host to determine unauthorized network usage.

In accordance with an aspect of the invention, a flow is terminated if no communications occur between the two IP addresses and the one low port (e.g. port 80) for 330 seconds. Most Web browsers or a TCP connection send a reset packet (i.e. a packet with the R flag set) if no communications are sent or received for 5 minutes.

The next flow illustrated is email traffic between the client and server utilizing server port 25. The client email application opens a random high ephemeral port, e.g. port 49,948 as illustrated in FIG. 5. The client's email application sends the email utilizing the Simple Mail Transfer Protocol (SMTP) to the server's port 25. Port 25 is conventionally designated for SMTP communications. A flow is terminated if no communications are delivered between the two IP addresses and the low port for 330 seconds. If the client sends another SMTP email packet or packets within 330 seconds of the end of the first email to the server, only one flow would exist.

For example, as shown in FIG. 6, if a second email packet originating from the ephemeral port 35,720 is sent within 330 seconds, only one flow would exist. If the second email packet was later than 330 seconds from the first sent email, it would be classified as another flow for analysis purposes. Again, port profiling engine will update ADDRESS1 as a client utilizing port 25 and ADDRESS0 as the server utilizing port 25 in the "seen today" structure. The port profiling engine compares the port profile of each host with the current activity for that host to determine unauthorized network usage.

As is well known, the File Transfer Protocol (FTP) is the simplest method to exchange files between hosts on the Internet. A client begins a session by sending a request to communicate to port 21 of designated server machine. The client also includes a second port number to be used when data is exchanged. The server initiates the exchange from its own port 20 (FTP DATA) to the port designated by the client, port 4993 as illustrated in FIG. 4. In the "passive" mode, FTP uses one or more TCP connections using two ephemeral ports. The port profiling engine treats these secondary connections as part of "TCP port 21" operation. The port profiling engine compares the port profile of each host with the current network service for that host to determine unauthorized network usage.

The collected flow data is analyzed to determine the associated network service provided. A host data structure is maintained containing a profile of the network services normally associated with the host and the associated zone locking data.

If the observed network service is not one of the normal network services performed as defined by the port profile for that host, an alarm signal is generated and action can be taken based upon the detection of an Out of Profile network service. An Out of Profile operation can indicate the operation of a Trojan Horse program on the host, or the existence of a non-approved network application that has been installed.

Additionally, even if the service is in profile, the service may not be allowed if initiated from an unauthorized host. The port profiling engine determines whether the zone of the host acting as a client has authorization to initiate communications with the host receiving the communication. If the zone of the client is designated as a blocked zone, the port profiling engine checks to see if the particular service is included in the lockout exclusion. An alarm is generated upon determining an unauthorized communication.

Port Profiling Engine

FIG. 7 illustrates a logical software architecture of a port profiling engine 155 constructed in accordance with an embodiment of the present invention. As will be understood by those skilled in the art, the system is constructed utilizing Internet-enabled computer systems with computer programs designed to carry out the functions described herein. Preferably, the various computing functions are implemented as different but related processes known as "threads" which executed concurrently on modern day multi-threaded, multi-tasking computer systems.

Figure 9:
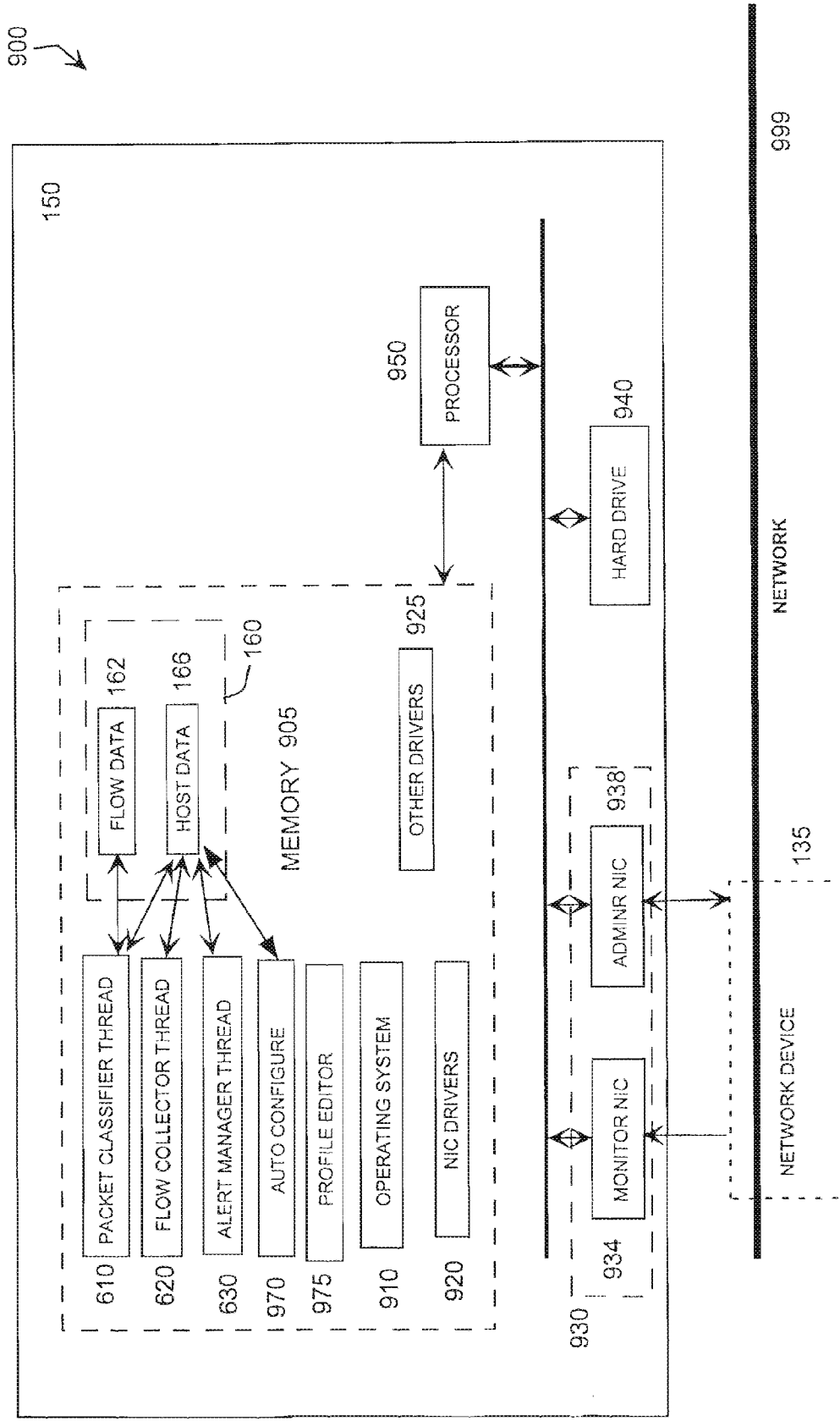
FIG. 9 is a functional block diagram illustrating hardware architecture.

The computer programs or threads are executed on a computer system 900 constructed as described in reference to FIG. 9, which illustrates a suitable exemplary computer system that may be utilized to construct a monitoring appliance 150 including a port profiling engine 155, or a separately implemented port profiling engine. Although the described embodiments are generally described in reference to an Internet-accessible computer system that is dedicated to implementing the engine 155, those skilled in the art will recognize that the present invention can be implemented in computer program code that can execute in conjunction with other program modules in various types of general purpose, special purpose, or dedicated computers. Accordingly, it will be understood that the terms "computer," "operating system," and "application program" include all types of computers and the program modules designed to be implemented by the computers.

The discussion of methods that follow, especially in the software architecture, is represented largely in terms of processes and symbolic representations of operations by conventional computer components, including a central processing unit (CPU), memory storage devices for the CPU, network communication interfaces, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network.

The processes and operations performed by the computer include the manipulation of signals by a CPU, or remote server such as an Internet Web site, and the maintenance of these signals within data structures reside in one or more of the local or remote memory storage devices. Such data structures impose a physical organization upon the collection of data stored within a memory storage device and represent specific electrical, optical, or magnetic elements. These symbolic representations are the means used by those skilled in the art of computer programming and computer construction to effectively convey teachings and discoveries to others skilled in the art. For the purposes of this discussion, a process is understood to include a sequence of computer-executed steps leading to a concrete, useful, and tangible result, namely, the detection of unauthorized network usage based upon network service activity.

These steps generally require manipulations of quantities such as IP addresses, packet length, header length, start times, end times, port numbers, and other packet related information. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, Points, records, objects, images, files or the like. It should be kept in mind, however, that these and similar terms should be associated with appropriate quantities for computer operations, and that these terms are merely conventional labels applied to quantities that exist within and during operation of the computer.

It should also be understood that manipulations within the computer are often referred to in terms such as displaying, deciding, storing, adding, comparing, moving, positioning, placing, and altering which are often associated with manual operations performed by a human operator. The operations described herein include machine operations performed in conjunction with various input provided by a human operator or user that interacts with the computer. In addition, it will be understood that the programs, processes, routines and methods described herein are not related or limited to any particular computer or apparatus, nor are they related or limited to any particular communication network or computer architectures. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hardwired logic or programs stored in nonvolatile memory, such as read only memory.

With the foregoing in mind, the drawing figures starting with FIG. 7, and the accompanying appendix of computer program code, illustrate various functions, processes, or routines carried out by an embodiment of the present invention. It will also be understood that the processes and methods presented here may be arranged differently, or steps taken in a different order. In other words, some processes and methods may be deleted, repeated, re-ordered, combined, or blended to form similar processes and methods.

FIG. 7 illustrates the operation of the preferred port profiling engine 155. The engine stores data from its operations in a database 160, which in the disclosed embodiment comprises two data structures—one used to collect statistics on data flows (flow data structure 162) in progress, and another to accumulate date on the host computers (host data structure 166) involved in those flows. According to the embodiment, the port profiling engine 155 uses three main threads or processes that read and write these data structures to identify possible unauthorized network usage, which are identified as Out of Profile network services. These threads are a packet classifier thread 710, a flow collector thread 720, and an alert manager thread 730. The threads also identify the client and server network applications that are being operating by the hosts that are observed participating in the flows observed (port profiling).

Packet Classifier

The header data is read by the packet classifier thread 710. The packet classifier thread 710 runs whenever new packet information is available. Based on the source and destination IP addresses, the thread 710 searches for an existing flow in the flow data structure 162. To facilitate searching and record insertion, a symmetric hash of the two IP addresses is generated and used as the index of an array that points to the beginning of a two-way linked list of all flows with that hash value. As known to those skilled in the art, a symmetric hash is a mathematical process that creates a probabilistically unique number that facilitates rapid indexing and sorting within a data structure such as flow data structure 162.

Flow processing is done for TCP and UDP packets, and the port numbers in the transport layer header are used to identify the flow record to be updated. For ICMP packets that constitute rejections of a packet, the copy of the rejected packet in the ICMP data field is used to identify the IP addresses and port numbers of the corresponding flow.

For purposes of the description which follows, the IP address with the lower value, when considered as a 32-bit unsigned integer, is designated ip[0] and the corresponding port number is designated pt[0]. The higher IP address is designated ip[1] and the corresponding TCP or UDP port number is designated pt[1]. At some point, either pt[0] or pt[1] may be designated the "server" port by setting an appropriate bit in a bit map that is part of the flow record (record "state", bit 1 or 2 is set).

If a particular packet 101 being processed by the packet classifier 710 matches a particular entry or record in the flow data structure 162, data from that particular packet 101 is used to update the statistics in the corresponding flow data structure record. A packet 101 is considered to match to a flow data structure record if both IP numbers match and:
  a) both port numbers match and no port is marked as the "server" port, or
  b) the port number previously marked as the "server" port matches, or
  c) one of the port numbers matches, but the other does not, and the neither port number has been marked as the server port (in this case the matching port number is marked as the "server" port).

If no prior data record exists in the flow data structure 162 that matches the current packet, a new flow data record is created in the flow data structure 162 using the IP addresses and port numbers from the current packet, and is linked to the end of the appropriate linked list of flow records. The time that the flow started, i.e. the first packets capture time, is written into the record as the "start" time, in a predetermined field of the data record. The time of each packet is written into the record "last", overwriting the previous value.

Flow Data Structure

The preferred flow data structure 162 has a plurality of different fields in each record. Since packet header information is analyzed for port profiling, other flow information can be accumulated from the packet header data for analysis. The preferred flow data structure (in the known C programming language) is as follows, where the index shown as [2] (0 or 1) is "0" if the packet source is the host ip[0], "1" otherwise (e.g. if the packet source is ip[1], then the packet bytes are added to bytes[1], pkts[1] is incremented, etc.):

```
#define SLOTS 131073 //no. flows in data table
struct flow_db {
    unsigned long ip[2] ; // ip[0] - lower ip address - ip[1] - higher
      ip address
    unsigned short pt[2] ; //tcp or udp ports, pt[0] and pt[1]
    unsigned short service ; // port number of server
    unsigned long down ; // linked list index
    unsigned long up;    // linked list index
    unsigned long start ; // time Flow started
    unsigned long last ; // time Flow ended
    unsigned long state ; // Server =0, 2 or 4, UDP = 1 (Server Port
      Marked)
    unsigned long bytes[2] ; // bytes sent by ip[0] and ip[1]
    unsigned long pkts[2] ;  // packets sent by ip[0] and ip[1]
    unsigned long flgs[2] ; // bitmap of all TCP flags seen
    unsigned char flag[2][7];//0 bad, 1 reset, 2 urgent, 3 syn, 4 syn-ack,
      5 fin, 6 fragments, // (counts of packets seen with various
      TCP flag combinations)
  - 7     UDP rejects
    unsigned short scans ; // max number ports seen for ip pair, detects
      "Port Scans"
        } flow[SLOTS] ;
```

Notice that many of the fields are counters for each host, e.g., the number of packets and bytes sent, the number of packets with various TCP flag-bit combinations sent for TCP flows, the number of ICMP "port-unavailables" for a UDP flow. Also bitmaps can be filled in, such as the bitmap of all TCP flags seen which has been bitwise OR'ed with the TCP flag field of each TCP packet. Data is filled in for the source (originating) host.

The packet classifier thread 710 also adds some data directly to the host data structure 166. Most of this data could be added later by the flow collector thread 720 (such as bytes sent by each host), but adding it on a packet by packet basis allows collection of real time rate information (such as bytes sent in each time interval). These records are indicated in the host data structure 166 below.

Host Data Structure

The host data structure 166 accumulates data on all hosts that are observed participating in a flow. A description of this data structure in C language format follows:

```
#define HOST_SLOTS 65537 // number Host slots
struct host_db {
    // data added by the Packet Classifier Thread
        unsigned long ip ;     //ip address
        unsigned long down ; // linked list index
        unsigned long up;    // linked list index
        unsigned long start ;  // time host record started
        unsigned long last ;  // time of last packet from this host
        unsigned long udp_bytes ;  // UDP bytes sent and received
        unsigned long bytes_in ;   // bytes received
        unsigned long bytes_in_pp ;  // Bytes over last 5 min interval
        unsigned long bytes_in_mx ;  // max all day
        unsigned long pkts_in ; // packets received
        unsigned long bytes_ot ;   // for Web_alert period
        unsigned long bytes_ot_pp   ; // Bytes sent over 5 min interval
        unsigned long bytes_ot_mx ; // max bytes in 5-min interval
          all day
```

-continued

```
        unsigned long pkts_ot ; // packets sent
        unsigned long resets   ; //   TCP Reset packets received
        unsigned long rejects    ; // icmp 'port unavailable' packets
          received
        unsigned long bad_pkts ;   // SYN-ACK, and any other
          non-standard combination // data added by the Host Collector
          Thread
        unsigned long server   ; // 32 common server ports - seen today
        unsigned long client   ; // 32 common client ports - seen today
        unsigned long s_profile  ; // 32 common server ports -(in
          profile), predefined for common TCP and UDP services
        unsigned long c_profile  ; // 32 common client ports -(in
          profile)
        unsigned short s_list[ODD_MAX] ; // list of uncommon
          (odd) servers with bits to indicate the same info as the
          preceding four bit maps
        unsigned short c_list[ODD_MAX] ; // list of uncommon
          (odd) clients with bits to indicate the same info as the
          preceding four bit maps
        unsigned long s_flows   ; // Server in this many flows
        unsigned long c_flows    ; // Client in this many flows
        unsigned long pings ;  // pings
        unsigned long traces ; // traceroutes run
        unsigned long concern ; // accumulated CI
          // bits set by both threads to record "Alert Messages" such
          as "Bad TCP Flags".
        unsigned long alerts ; // bit map of alert conditions
        unsigned short locnetaddr;  //local network address
        unsigned short locnetmask;  //local network mask
        unsigned short locnetaddr;  //bitmap indicating client from that
          subnet is prohibited
        array(32,22) subnet_lockout_exclude;  //binary bitmap array
          of services excluded from zone lockout
        } host[ HOST_SLOTS ]
```

Flow Collector Thread

The flow collector thread 720 runs periodically (e.g., every five minutes) and searches linearly through the entire flow data structure 162 to find flows that have been inactive for a certain time period (e.g., 6 minutes). These flows are considered as finished and a logic-tree analysis is done to classify them as either a normal flow, or a potential probe or other suspicious activity.

Normal flows are those for which the corresponding statistics indicate a normal exchange of information between two hosts. The host that initiated the flow is considered the client (i.e. the computer that sent TCP SYN packets or sent an initial UDP packet). The other host is considered the server (i.e. the computer that sent TCP SYN-ACK packets or responded to a UDP packet). Some data is exchanged during a normal flow.

A potential probe is a flow that appears to have one host (a possible intruder) sending packets to gain information about another host (an intended victim). An example of a potential probe is a flow that has TCP packets of any sort sent by one host (the intruder) and approximately the same number of TCP reset packets sent by the other. Another example is a flow which has UDP packets answered by ICMP "port unavailable" packets. A flow with ICMP "destination unreachable" packets sent by one host would be considered a potential probe being done by the other host.

Figure 8:
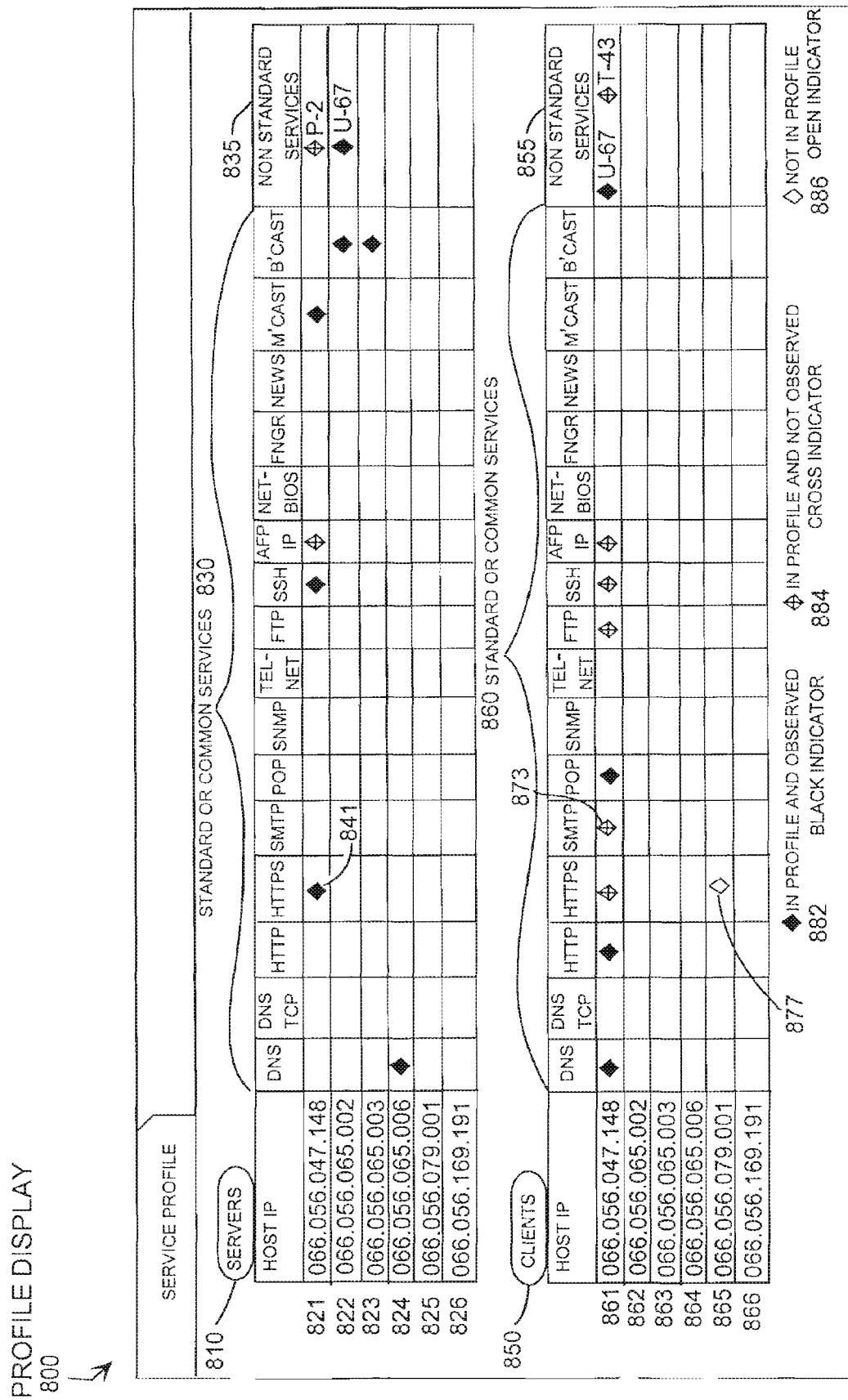
FIG. 8 is a screen shot illustrating the port profiling display.

After the flow is analyzed, the host data structure is updated. The port display, as illustrated in FIG. 8, reflects the updated information. A black diamond indicator indicates that the service has been previously seen today and is an authorized network service. A gray diamond or a diamond with an internal cross for non color displays indicates the service is seen for the first time today and is an authorized service. A red diamond shown as a clear diamond in a non-color display is an alert indicating an Out of Profile network service has been observed.

For the In Profile network services, the zone of the client host is determined If the communication is initiated from a designated unauthorized zone, the service zone lock override is consulted to determine if the service is exempt from the zone lockout. If the service is authorized from that zone, no alarm is initiated. If the service is unauthorized, an alarm is generated.

Additionally, after the flow has been analyzed, the flow record is then written to the flow log file and then cleared from the flow data structure.

Alert Manager Thread

The alert manager thread 730 runs periodically (e.g., following the flow manager thread 720) and does a linear search through the host data structure 166. As it does so, it compiles a number of lists that are written to various output files for use by user interface programs, i.e. programs that report information from the operation of the port profiling engine 155 of appliance 150.

For example, the alert manager thread 730 preferably generates a profile display 746 of hosts that Out of Profile network services used as illustrated in reference to FIG. 7. A screen to display for the network administrator a list of all "inside hosts" (hosts in the network of concern) which shows (using color coding) ports that are in the port profile (gray if not seen today, black if seen today) and Out of Profile (red, seen for the first time today). If a range, or set of ranges, of IP addresses have been defined by the network administrator as "inside addresses," separate lists can be generated for "inside" and "outside" hosts. Numerous other queries and reports 748 can be generated for review and analysis by a network system administrator.

The packet classifier thread 710 collects information on network operations such as packets and bytes on a per-second, per-minute, and per-hour basis. This information is collected on all packets and on certain categories of packets such as TCP and UDP and subsets of these based on port number. Histograms of packet size and TCP or UDP port numbers are also collected. The alert manager thread 730 writes the updated data to various output files for use by the user interface, or for later off-line analysis.

The alert manager 730 looks for hosts whose network usage indicates unauthorized services. The new alarm conditions can cause immediate operator notification by an operator notification process 742. These conditions can be highlighted on the user interface, and cause SNMP trap messages to be sent to a network monitor such as HP Openview, and/or email messages to the network administrator which in turn may cause messages to be sent to beepers or cell phones. Messages can also be sent to cause automated devices such as a firewall manager 744 to drop packets going to or from an offending host. It will thus be appreciated that the present invention advantageously operates in conjunction with firewalls and other network security devices and processes to provide additional protection for an entity's computer network and computer resources.

Zone Lock Policy

The afore described threads operate using an administrator defined configuration file. The port profiling engine 155 reads this file any time the file has been changed. While reading the configuration file, the following code is used to define the zones (subnets) as well as policy access rules for each zone and the exclusions for services:

```
// create a bitmap of common services that can be excluded
from the zone lockout...
    else if (!strncmp (param_id, "subnet_lockout_exclude", 22))
    {
        zone_service = atoi(param_value);
        if ( zone_service < PORT_MASK_MAX )
            zone_override |= port_mask [ zone_service ];
    }
    else if (!strncmp (param_id, "locNetAddr", 10))
    {
        if (param_value[0] == '\0')
            continue;
        // locNetAddr is blank
        sscanf (param_id, "locNetAddr[%ld", &i);
        if (i >= MAX_LOCAL_SUBNETS)
            continue;         // too many subnets
        net[i] = dotdecimal_to_long (param_value);
    }
    else if (!strncmp (param_id, "locNetMask", 10))
    {
        if (param_value[0] == '\0')
            continue;
        // locNetMask is blank
        sscanf (param_id, "locNetMask[%ld", &i);
        if (i >= MAX_LOCAL_SUBNETS)
            continue;
        // too many subnets
        mask[i] = dotdecimal_to_long (param_value);
    }
    else if (!strncmp (param_id, "locNetMonitorMask", 17))
    {
        if (param_value[0] == '\0')
            continue;
        // locNetMask is blank
        sscanf (param_id, "locNetMonitorMask[%ld", &i);
        if (i >= MAX_LOCAL_SUBNETS)
            continue;
        // too many subnets
        // mask[i] = dotdecimal_to_long (param_value);
        // client_disallowed_mask [ MAX_LOCAL_SUBNETS ]
        // input the disallowed subnet mask
        client_disallowed_mask[i+1] = 0;
        for ( j = MAX_LOCAL_SUBNETS - 1; j >= 0; j--)
        {
            client_disallowed_mask[i+1] =
            client_disallowed_mask[i+1]
              << 1;

if ( param_value[j] == '1' )
                client_disallowed_mask[i+1] |= 1;
        }
    }
    zone_override = ~zone_override;
// ------------------------------------
```

The zone locking methodology is based on the use of subnets as these are defined in the current program architecture. As illustrated in reference to FIG. 3, for each subnet or zone, three parameters are defined. The first parameter LocNetAddr is the local network IP address. The second parameter LocNetMask defines the local net mask The subnet masks is used in a known manner to determine which subnet an IP address belongs. The third parameter LocMonitorMask is a bit map. For each subnet in which a one in the bit position indicates that a client from that subnet is prohibited from the subnet to which the mask belongs. This data is loaded into an array of binary bitmasks known as client_disallowed_mask.

The methodology allows a service to be exempt from the zone lock. A system administrator may allow a service(s) to pass between two zones, but to alarm on any other service. The service override is accomplished by the subnet_lockout_exclude variable. This variable contains the services to be allowed to pass through otherwise locked zones. A bitmap is constructed consisting of common services and assigned to the zone_service variable. After all of the services are defined, zone_service is complemented to facilitate rapid testing of the zone locking.

As packets 101 arrive in the port profiling engine 155, the packets 101 are processed into flows based upon IP address and service. At this point, a flow is defined or classified for that communication between the two hosts. At this time, the port profiling engine 155 has the information to perform the zone locking.

The flow collector updates the host profile and sets the profile for this flow's service to active. For the Client host, service_bit_map is set to indicate protocol type, client service and service number. The flow service is compared to the services allowed to bypass zone locking by bitwise AND operation of the service bitmap with the zone override variable. If the result is zero, no alarm will be generated and service zone locking process is terminated for this flow.

The port profiling engine 155 next determines the client zone. In this exemplary implementation, this zone is the subnet in which the inside host resides. Then the server zone is determined The first subnet however is defined as "outside hosts" and is valid for either client hosts. Then, a determination is made if the subnet access by client is allowed. A logical bitwise ANDing of the mask defined for the server subnet with the appropriate mask bit of the client subnet will indicate if the client is allowed to access the server. If the communication is not allowed, an immediate alarm is issued.

Profile Display

FIG. 8 illustrates an exemplary screen display 800 of the service profile for the network administrator. The display 800 includes a list of all "inside hosts" (hosts in the network of concern) which shows (using color coding) ports that are in the port profile (gray if not seen today, black if seen today) and Out of Profile (red, seen for the first time today). If non-color display is utilized, the gray indicator can be illustrated as a crossed diamond and a red indicator as a clear diamond. A range, or set of ranges, of IP addresses can be defined by a network administrator as "inside addresses."

Display 810 shows each inside host IP address 821-826 and associated common 830 and non-standard 835 server network services in which the host acted as a server. Additionally, the display 850 shows each inside host IP address 861-866 and associated common 860 and non-standard 855 client network services in which the host acted as a client. Each service seen or used in the last 24 hours is indicated by a diamond. A black diamond 882 indicates the service is in profile and has been previously observed today. For example, indicator 841 is a black diamond indicating the IP address 066.065.047.148 has acted as a server previously today using the HTTPS service and the HTTPS server service is in profile for this host. A gray (or crossed) diamond 884 indicates the service is in profile and has been not previously observed before today. For example, indicator 841 indicates the IP address 066.056.047.148 has sent an email using the SMTP for the first time today and the host is authorized to use SMTP as a client. A red diamond (or clear) 886 indicates that the observed service is Out of Profile for that host. For example, indicator 877 is a red diamond indicating the host has used an Out of Profile service. In this case, host 066.056.079.001 has acted as a client using the HTTPS service, which is not in this host's service usage profile.

The display 800 shows the common or standard network server services 830 and common network client services 860 selected by the network administrator for presentment. In addition, the non standard server services 835 and non standard client services 855 are displayed. The following table provides a description of the services displayed and the associated port numbers for selected but exemplary standard network service:

| Label on Column | Service Name | UDP and TCP Port Numbers Included |
|---|---|---|
| DNS | Domain Name Service - UDP | UDP 53 |
| DNS TCP | Domain Name Service - TCP | TCP 53 |
| HTTP | Web | TCP 80 |
| HTTPS | Secure Web (SSL) | TCP 443 |
| SMTP | Simple Mail Transport | TCP 25 |
| POP | Post Office Protocol | TCP 109, 110 |
| SNMP | Simple Network Management | TCP 161, 162 UDP 161, 162 |
| TELNET | Telnet Terminal | TCP 23 |
| FTP | File Transfer Protocol | TCP 20, 21 |
| SSH | Secure Shell (terminal) | TCP 22 |
| AFP IP | Apple File Protocol/IP | TCP 447, 548 |
| NETBIOS | NetBIOS (Windows) | TCP 137-139, UDP 137-139 |
| FNGR | Finger | TCP 79 |
| NEWS | Usenet, Network News | TCP 119 |
| M'cast | Multicast | IP addresses 224.0.0.0-239.255.255.255 |
| B'cast | Broadcast | IP addresss 255.255.255.255 or [net, subnet, −1] |

The non-standard services are those network services that are not the most commonly seen services utilizing either the TCP or UDP transport layer protocol. In addition, if other transport layer protocols are seen other than TCP, UDP, or ICMP, these protocols are treated as non-standard network services. As described in reference to FIG. 4, there are 251 other protocols that can be designated by the "next protocol" field in the IP header besides the three common Internet Transport Layer protocols (ICMP, TCP, and UDP). There are generally no port numbers with these other protocols, so these other protocols are indicated simply by the "protocol number." The Internet Control Message Protocol (ICMP), referred to as protocol number 1, is not tracked because any host using IP would be using ICMP. The host using these protocols are all shown as "servers" since many of the protocols are peer-to-peer and the transport protocol number indicates the service. Both the common (standard) and non-standard network services are discussed in greater detail in reference to FIG. 2.

Hardware

A preferred hardware configuration 900 of an embodiment that executes the functions of the above described port profiling engine is described in reference to FIG. 8. FIG. 9 illustrates a typically hardware configuration 900 for an unauthorized network usage detection system. A monitoring appliance 150 serves as a pass-by filter of network traffic. A network device 135, such as a router, switch, hub, tap, or the like, provides the location for connecting the monitoring appliance 150 to the network 999 for monitoring the network traffic.

As illustrated, the monitoring appliance 150 is preferably configured with two network interface cards (NIC) 930 such as 3COM brand model 932 10/100 MHz adapters or other adapters to match the network. However, it should be apparent to one skilled in the art that one or more cards can be utilized to accomplish the functions of the presently described dual card system. The monitor NIC 934 is typically set to a promiscuous mode or a similar function. The promiscuous mode is a mode of operation in which every data packet passing through the network device 135 will be received and read. An admin NIC 938 allows network interfacing and handles commands sent from the monitoring appliance 135. NIC drivers 920 enable the network traffic data to be exchanged with the processor 950. Other drivers 925 are utilized to interface or communicate with other devices including peripherals. These peripherals include keyboards, monitors, printers, storage devices, and other input/output devices. As one skilled in the art will appreciate, such drivers are typically packaged with the system.

The operating system 910 for the computer 900 preferably needs to be compatible with the hardware of the monitoring appliance 150. One operating system 910 that can be utilized is the operating system referred to as LINUX. One skilled in the art will appreciate that other operating systems may be readily substituted. As is known to those skilled in the art, the operating system of a computer controls the operation of the processor 950. The processor 950 interfaces with the memory 905 to execute programs. Preferably, the monitoring appliance will have 128 megabytes or more of memory.

As discussed in reference to FIG. 7, the processor 950 executes the packet classifier thread 710, the flow collector thread 720, and the alert manager thread 730. These threads interact with flow data structure 162 and the host data structure 166, as described. The data structures provide temporary storage of information. As discussed in reference to FIG. 7, a log file is maintained on the hard drive 940 for forensic analysis, if desired.

In the exemplary embodiment, an auto configure module 970 is executed by the processor 950. The auto configure module 970 is operable to enable the port profile host data 166 for each host to be automatically generated as discussed in reference to FIG. 2. Additionally, this embodiment can includes an profile editor 980. The processor 950 executed the profile editor enabling the modification of the port profile host data 166 and input of the zone locking configuration data.

Flow Charts

Refer now to FIG. 10 for a discussion of the steps of the preferred packet classifier, flow collector, and alert manager threads. As previously discussed in reference to FIG. 7, the preferred port profiling engine 155 comprises three operational threads or processes that execute within a system or appliance that implements an embodiment of the invention. The packet classifier thread 710 classifies packets into their associated flow and updates the flow records. The flow collector thread 720 determines a termination of a flow, performs a logic tree analysis to classify the flow, and determines the port usage, and updates the port display. Finally, the alert manager thread 730 generates reports and alarm signals if an alarm threshold is exceeded.

Figure 10A:
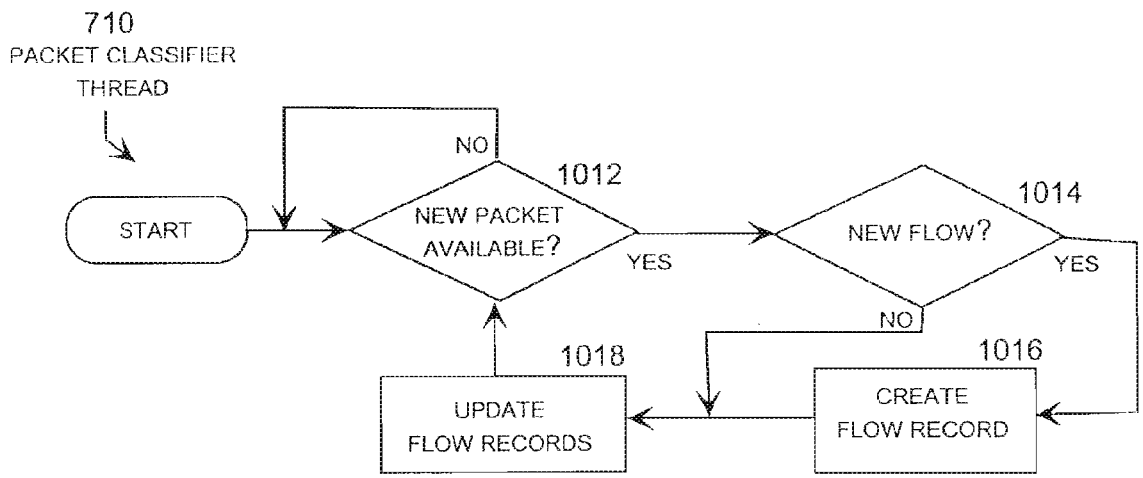
FIG. 10, consisting of FIGS. 9A through 9C, are flow charts of the program threads in an exemplary embodiment of the invention.

In FIG. 10A, the flow classifier thread 710 begins with step 1012. In step 1012, the thread 710 determines if a new packet is available. If a new packet is not available, the no branch of step 1012 is followed to step 1012, in which the thread 710 awaits a new packet. If a new packet is available, the yes branch of step 1012 is followed to step 1014, in which the thread determines if the packet belongs to a new flow.

As discussed previously, the header data if each packet processed is read by the packet classifier thread 710. Based on the IP addresses and service, the thread 710 searches for an existing flow in the flow data structure 162, which is embodied as a data array in memory.

Flow processing is done for TCP and UDP packets, and the port numbers in the transport layer header are used to identify the flow record to be updated. For ICMP packets that constitute rejections of a packet, the copy of the rejected packet in the ICMP data field is used to identify the IP addresses and port numbers of the corresponding flow.

If a new flow is determined, the yes branch of step 1014 is followed by step 1016. In step 1016, a new flow record is created. If no flow exists that matches the current packet, a new flow record is started using the IP addresses and port numbers from the current packet, and is linked to the end of the appropriate linked list of flow records.

The IP address with the lower value, when considered as a 32-bit unsigned integer, is designated ip[0] and the corresponding port number is designated pt[0]. The higher IP address is designated ip[1] and the corresponding TCP or UDP port number is designated pt[1]. At some Point, either pt[0] or pt[1] may be designated the "server" port by setting a the appropriate bit in a bit map that is part of the flow record (record "state", bits 1 or 2 set).

Step 1016 is followed by step 1018, in which the flow records in the flow data structure 162 are updated. The time that the flow started, the packet capture time, is written into the record "start." The flow data structures updated by the packet classifier thread is discussed in detail in reference to FIG. 7. Step 1018 is returned to step 1012, in which the thread 710 determines if a new packet is available.

Figure 10B:
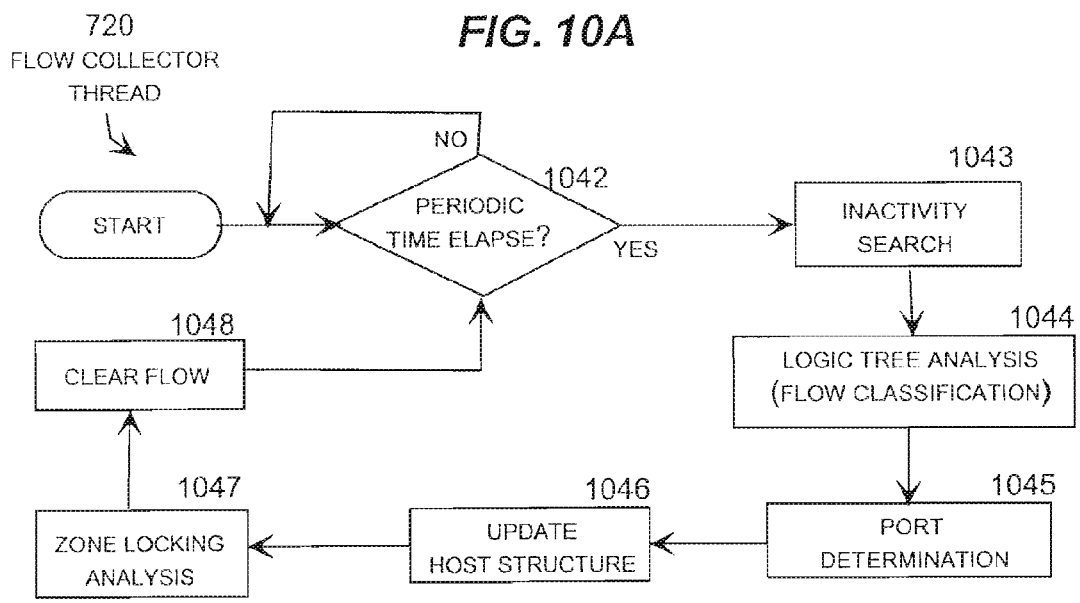

Referring next to FIG. 10B, the flow collector thread 720 begins with step 1042. In step 1042, the thread 720 determines if a periodic time has elapsed, e.g. 5 minutes in the disclosed embodiment. If the requisite time period has not elapsed, the no branch of step 1042 is followed to step 1042, in which the thread 720 awaits the time to elapse.

If the time has elapsed, the yes branch of step 1042 is followed to step 1043, in which the thread 720 performs an inactivity search. The flow collector thread 720 runs periodically (e.g., every five minutes) and searches linearly through the entire flow data structure 162 to find flows that have been inactive for a certain time period (e.g., 6 minutes, although this time is arbitrary and may be heuristically determined). These flows are considered finished.

Step 1043 is followed by step 1044. In step 1044, a logic-tree analysis is done to classify the flows. The profile for this flow's service is set to active.

Step 1044 is followed by step 1045, in which a service port number is assigned to each flow. Each host is assigned a service port number, a protocol such as TCP, UDP or other, and type of operation which is either network service usage as a client or server.

Step 1045 is followed by step 1046. In step 1046, the flow record is written to the flow log file. In addition, the host data structure is updated to reflect the observed services. Additionally, the port display is updated to indicate whether the port has been previously seen today and whether the service is in profile for that host.

Step 1046 is followed by step 1047. In step 1047, the service zone locking is performed. The flow service is compared to the services allowed to bypass zone locking for the client host. The client zone and the server zones are determined Then a determination is made if the subnet access by the client is allowed. If the communication is not allowed, an immediate alarm is generated.

Step 1047 is followed by step 1048. In step 1048, the flow record is cleared from the flow data structure. After step 1048, the thread is returned to step 1042, in which the thread awaits for the requisite time.

Figure 10C:
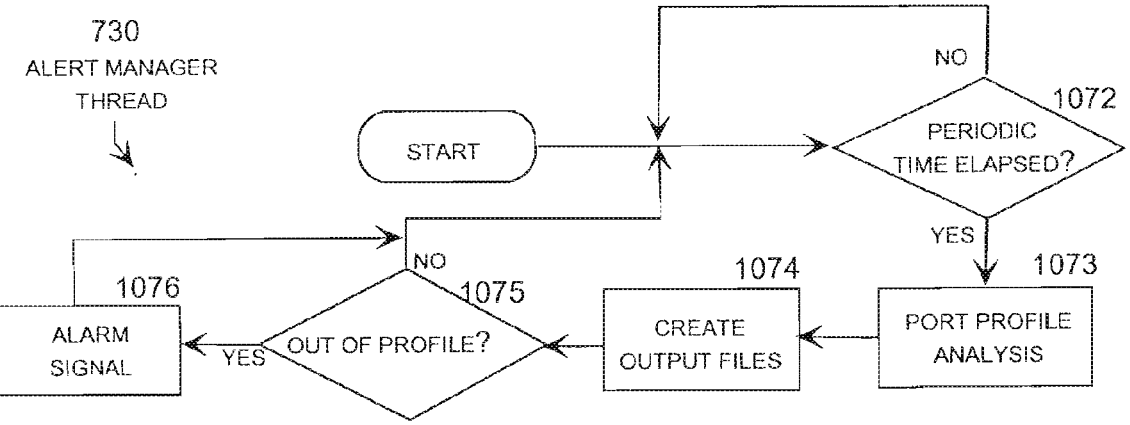

Referring next to FIG. 10C, the alarm manager thread 730 begins with step 1072. In step 1072, the thread 730 determines if a periodic time has elapsed. If the requisite time period has not elapsed, the no branch of step 1072 is followed to step 1072, in which the thread 730 awaits the time to elapse.

If the time has elapsed, the yes branch of step 1072 is followed to step 1073, in which the thread 1030 performs port profile search. The alert manager thread 730 runs periodically (e.g., following the flow manager thread 720) and does a linear search through the host data structure 166.

Step 1073 is followed by step 1074. In step 1074, the port profiling engine 155 compiles a number of lists that are written to various output files for use by the user interface programs. If a range, or set of ranges, of IP addresses have been defined by the network administrator as "inside addresses," separate lists can be generated for "inside" and "outside" hosts. Numerous other queries and reports 748 can be generated for review and analysis by the network administrator. The alert manager thread 730 writes the updated data to various output files for use by the user interface, or for later off-line analysis.

Step 1074 is followed by step 1075, in which the thread 730 determines services if an observed service is unauthorized by comparing observed network usage with the allowed network services. If an observed service is authorized, the no branch of step 1075 is returned to perform step 1072. In step 1072, the thread 730 determines if a requisite time period has elapsed.

If a service is found to be unauthorized, the yes branch of step 1075 is followed to step 1076. In step 1076, the alert manager thread generates certain predetermined signals designed to drawn the attention of a system administrator or other interested person. These conditions can be highlighted on the user interface, and cause SNMP trap messages to be sent to a network monitor such as HP Openview, and/or email messages to the network administrator which in turn may cause messages to be sent to beepers or cell phones. Messages can also be sent to cause automated devices such as a firewall manager to drop packets going to or from an offending host. Step 1076 is followed by step 1072, in which the thread 730 awaits the requisite amount of time.

In view of the foregoing, it will be appreciated that the present invention provides a port profiling system that is robust, scalable, efficient, and overcomes various problems with conventional signature-based or pure anomaly-based detection systems. It should be understood that the foregoing relates only to the exemplary embodiments of the present invention, and that numerous changes may be made therein without departing from the spirit and scope of the invention as defined by the following claims. Accordingly, it is the claims set forth below, and not merely the foregoing illustration, which are intended to define the exclusive rights of the invention.

Zone Configuration

FIG. 11 illustrates an exemplary monitoring IP configuration input screen 1100. The input screen 1100 is displayed in response to a selection of the monitor IP button 1130 displayed as a drop down option from the selection of the configuration 1120 button. Selecting the monitor IP button 1130 display monitored IP configuration display 1110.

The screen allows the input of IP network addresses in the IP network column 1140. As illustrated, 20 IP network addresses can be defined. The IP address is inputted as dotted quad notion. Each IP address identifies a zone for that network. Illustrated is a zone defined with an IP address of 192.168.1.0 and a second zone defined with an IP address 66.56.79.1. The IP network mask column 1150 provides input fields for the subnet mask. The subnet mask divides the network into subnets or defined zones. A subnet is a portion of a network that shares a common IP address component. As illustrated all hosts with the network IP address prefix 192.168.1 would be classified in the same zone. Only one host, 66.56.79.1, is in the other classified zone, subnet 66.56.79.1.

The toggle boxes in the monitor traffic between networks column 1160 allows the system administrator to select custom settings or enable all traffic for the zone. As illustrated, both illustrated zones have been selected for customization. The modify buttons 1170 will cause the generation of access policy screen as illustrated in reference to FIG. 12. The reset button 1183 will clear previously entered inputs. The apply button 1181 will apply the monitoring policies as inputted.

Figure 12:
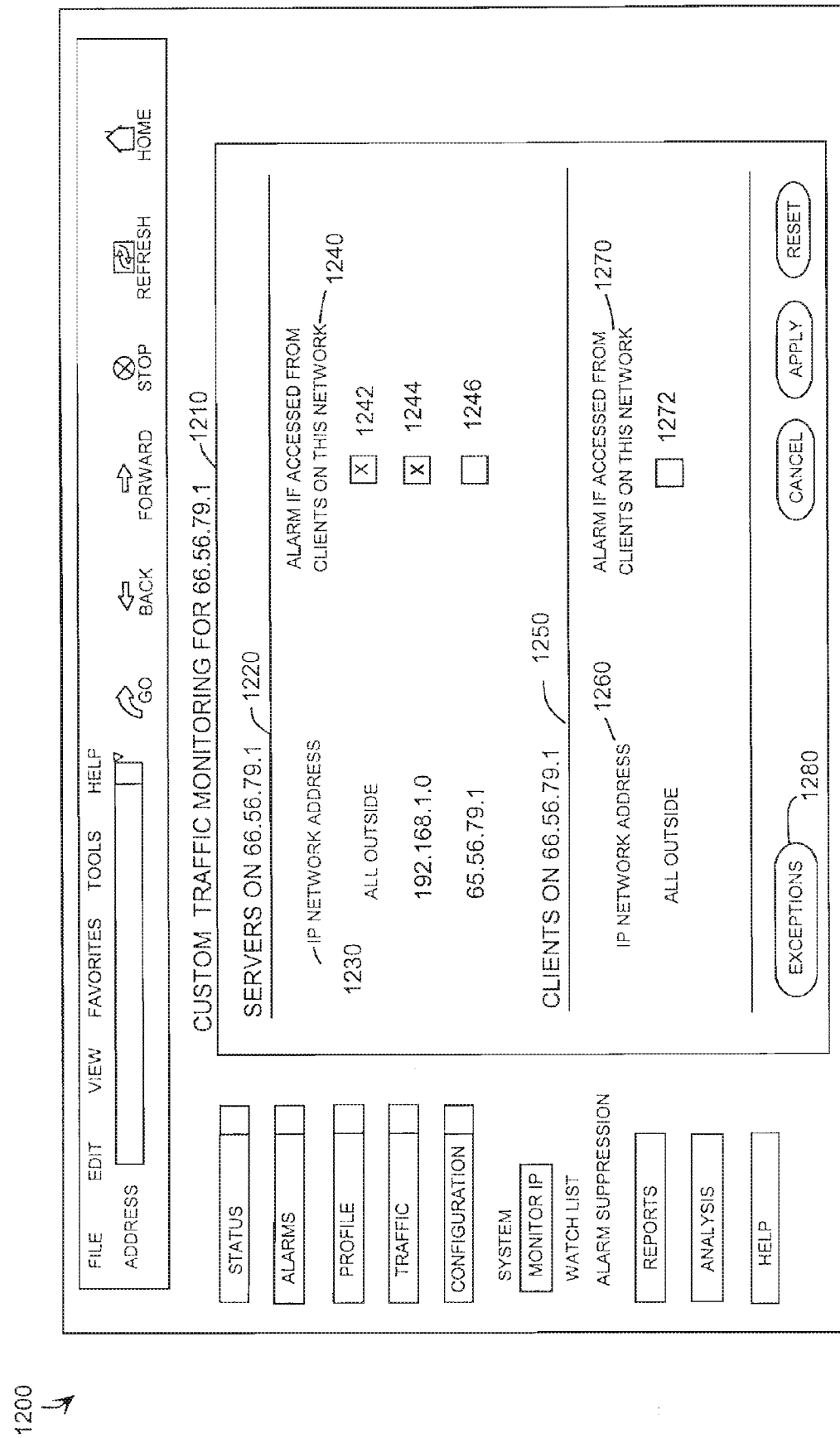
FIG. 12 is an exemplary screen shot of custom traffic monitoring.

FIG. 12 illustrates an exemplary custom traffic monitoring input screen 1200. This input screen 1200 is displayed in response to a selection of the custom button 1170 in referenced in FIG. 11. This policy screen 1200 defines which subnets can be accessed by which hosts. In this case, the server subnet 66.56.79.1 is a single server with an IP address 66.56.79.1. The policy screen 1210 defines two sections, server section 1210 for to set policy for the servers on 66.56.79.1 and another client section 1250 for clients on 66.56.79.1.

For example, in the referenced custom traffic display 1210, the "all outside" check box 1242 and the 192.168.1.0 subnet box 1244 of the alarm if accessed column 1240 are checked. Consequently, any client connection from an outside host or from a host in the 192.168.1.0 subnet listed in the IP network column 1230 that attempts to connect to the server 66.56.79.1 will generate an alarm.

As illustrated, the second section 1250 determines if clients on this subnet can access outside hosts. The network address column 1260 list the applicable networks. To generate an alarm on access to outside hosts, the all outside box 1272 of the alarm column 1270 would be selected.

Figure 13:
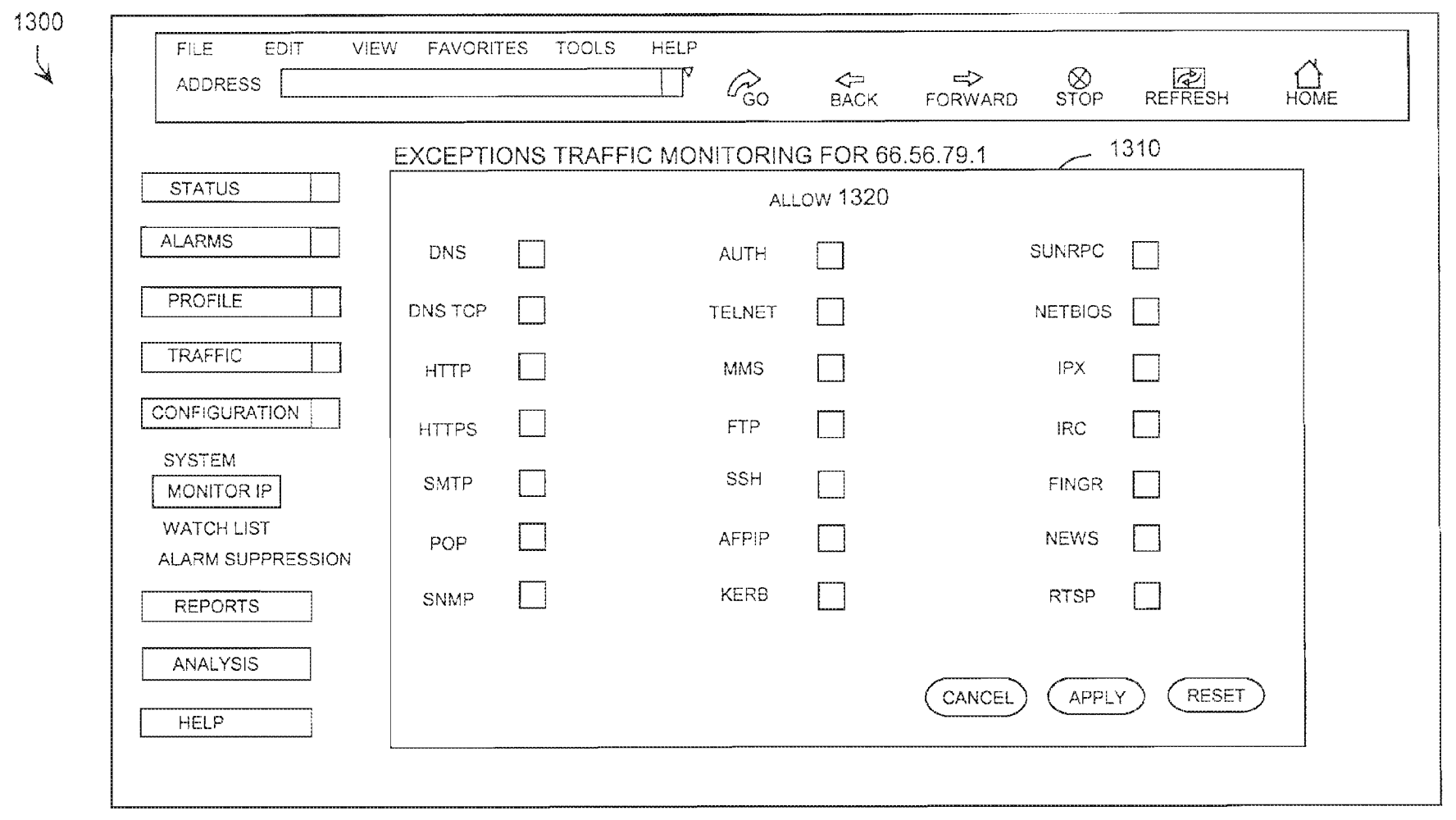

In this example, the exceptions button 1280 provides for the display of a services exception screen illustrated in reference to FIG. 13.

FIG. 13 illustrates an exemplary custom monitoring exceptions input screen 1300. The input screen 1300 is displayed in response to a selection of the exceptions button 1280 illustrated in reference to FIG. 12. Selecting exceptions button 1280 displays custom traffic monitoring exceptions display 1310 for 66.56.79.1. The allow boxes 1320 provide selection fields for which client services will be allowed from a restricted zone.

The following table defines the services referenced in the exceptions display 1310:

| Label | Service Name |
|---|---|
| DNS | Domain Name Service - UDP |
| DNS TCP | Domain Name Service - TCP |
| HTTP | Web |
| HTTPS | Secure Web (SSL) |
| SMTP | Simple Mail Transport |
| POP | Post Office Protocol |
| SNMP | Simple Network Management |
| AUTH | Authentication Service |
| TELNET | Telnet Terminal |
| MMS | MultiMedia Services |
| FTP | File Transfer Protocol |
| SSH | Secure Shell (terminal) |
| AFP IP | Apple File Protocol/IP |
| KERB | Kerberos |
| SUNRPC | SUN Remote Process Call |
| NETBIOS | NetBIOS (Windows) |
| IPX | Internet Packet Exchange |
| IRC | Internet Relay Chat |
| FNGR | Finger |
| NEWS | Usenet, Network News |
| RTSP | Real Time Streaming Protocol |

In view of the foregoing, it will be appreciated that the invention provides for a detection of unauthorized network usage. It should be understood that the foregoing relates only to the exemplary embodiments of the present invention, and that numerous changes may be made therein without departing from the spirit and scope of the invention as defined by the following claims. Accordingly, it is the claims set forth below, and not merely the foregoing illustration, which are intended to define the exclusive rights of the invention.

INDUSTRIAL APPLICATIONS

The port profiling system efficiently and reliably monitors network traffic for unauthorized network usage with the ability to be scaled to large traffic flows. Consequently, the port profiling engine has applicability in the fields of network monitoring, network security, network devices, network communications, and similar fields.

What is claimed:

1. In a computer network wherein packets are communicated between devices on to the computer network, a method for a network monitoring appliance to provide an alarm signal indicating unauthorized network usage by a device on the computer network, comprising the steps of:
   providing a configuration file for use by the network monitoring appliance that includes data reflecting prior assignment of a plurality of devices into a plurality of zones where devices assigned to a first zone are not authorized to communicate with devices assigned to a second zone, a zone comprising a plurality of devices that are selected without regard to which physical network the devices are associated with and without regard to whether the devices in a same zone are in a same physical network or in another physical network, a zone comprising a plurality of devices that are authorized to communicate:
      (i) with other devices in the same zone that are on the same physical network, and
      (ii) with other devices in the same zone that are on different physical networks isolated by a network device, but
      (iii) not with other devices in the same physical network that are in different zones;
   the configuration file further including unauthorized zone data specifying designated zones for which devices in a particular zone are not authorized to communicate with other devices in a different unauthorized zone;
   passively monitoring network communications of the computer network by monitoring packets communicated between devices that have been assigned to the plurality of zones with the network monitoring appliance;
   capturing packet header information from monitored network communications;
   in response to captured packet header information from a device on the computer network, accessing the configuration file to determine whether said device is authorized to communicate packets with another device in the computer network;
   determining the zones participating in the monitored network communications based on information in the configuration file;
   determining unauthorized network usage based upon the unauthorized zone data in the configuration file and captured packet header information indicating that a device in a first zone is attempting to communicate with a device in a second but unauthorized zone; and
   upon detection of unauthorized network usage, generating an alarm from the network monitoring appliance for use by external equipment.

2. The method of claim 1, wherein the step of generating an alarm includes providing an address to a filtering table to block the unauthorized network usage.

3. The method of claim 1, wherein the steps of the method are carried out within a network device.

4. The method of claim 1, wherein the configuration file is maintained in the network device.

5. The method of claim 1, further comprising the step of providing a filter table comprising a list of source or destination addresses used to block unauthorized network usage.

6. The method of claim 1, wherein a configuration file is provided for each zone.

7. The method of claim 1, wherein a zone is defined by an IP address prefix, and wherein devices having the same IP address prefix are assigned to a single zone.

8. The method of claim 1, wherein a subnet mask divides a network into predefined zones.

9. The method of claim 1, wherein devices in one zone are allowed to communicate with devices in another zone utilizing a predetermined allowable service.

10. The method of claim 9, wherein the alarm is generated if a device in one zone communicates with a device in another zone using an unauthorized service.

11. The method of claim 1, wherein the zones are classified by user functions.

12. The method of claim 1, wherein the zones are classified by subnet.

13. The method of claim 1, wherein the zone data includes an additional zone for outside devices.

14. The method of claim 1, wherein the devices operate behind a firewall.

15. The method of claim 1, wherein the configuration file further includes override service data specifying particular network services in which devices in designated zones are authorized to communicate with devices in unauthorized zones notwithstanding the unauthorized zone data, and further comprising the step of permitting the communication between devices in response to the override service data.

16. In a computer network wherein packets are communicated between devices connected to the computer network in a client/server relationship, a method for a network monitoring appliance to generate an alarm signal indicating unauthorized network usage by a device on the computer network, comprising the steps of:
   providing a configuration file for use by the network monitoring appliance that includes data reflecting prior assignment of a plurality of devices including clients and servers into a plurality of zones where devices assigned to a first zone are not authorized to communicate with devices assigned to a second zone, a zone comprising a plurality of devices that are selected without regard to which physical network the devices are associated with and without regard to whether the devices in a same zone are in a same physical network or in another physical network, wherein devices as servers in a zone are authorized to communicate:
      (i) with other devices as clients in the same zone that are on the same physical network, and
      (ii) with other devices as clients in the same zone that are on different physical networks isolated by a network device, but
      (iii) not with other devices as clients in the same physical network that are in different zones;

the configuration file further including unauthorized zone data specifying designated zones for which devices in a particular zone are not authorized to communicate with other devices in a different unauthorized zone; passively monitoring network communications internal to the computer network by monitoring packets communicated between devices that have been assigned to the plurality of zones with the network monitoring appliance;

capturing packet header information from the monitored network communications;

determining the zones participating in the monitored network communications based on information in the configuration file;

determining unauthorized network usage based upon the unauthorized zone data in the configuration file and captured packet header information indicating that a client in a first zone is attempting to communicate with a server in a second but unauthorized zone; and generating an alarm signal from the network monitoring appliance for use by external equipment upon detection of unauthorized network usage.

17. The method of claim 16, wherein the steps of the method are carried out within a network device.

18. The method of claim 16, wherein the configuration file is maintained in the network device.

19. The method of claim 16, further comprising the step of providing a filter table comprising a list of source or destination addresses used to block unauthorized network usage.

20. The method of claim 16, wherein the step of generating an alarm signal includes adding a MAC address to the filtering table to block the unauthorized network usage.

21. The method of claim 16, wherein a configuration file is provided for each zone.

22. The method of claim 16, wherein a zone is defined by an IP address prefix, and wherein devices having the same IP address prefix are assigned to a single zone.

23. The method of claim 16, wherein a subnet mask divides a network into predefined zones.

24. The method of claim 16, wherein devices in one zone are allowed to communicate with devices in another zone utilizing a predetermined allowable service.

25. The method of claim 24, wherein the alarm is generated if a device in one zone communicates with a device in another zone using an unauthorized service.

26. The method of claim 16, wherein the zones are classified by user functions.

27. The method of claim 16, wherein the zones are classified by subnet.

28. The method of claim 16, wherein the devices operate behind a firewall.

29. The method of claim 16, wherein the configuration file further includes override service data specifying particular network services in which devices in designated zones are authorized to communicate with devices in unauthorized zones notwithstanding the unauthorized zone data, and further comprising the step of permitting the communication between devices in response to the override service data.

30. In a data communication network wherein packets are communicated between devices on the data communication network, a system for providing an alarm signal indicating unauthorized network usage by a device on the data communication network, comprising:

a computer system including a processor and a memory storing a configuration file that includes data reflecting prior assignment of a plurality of devices connected to the data communication network into a plurality of zones, a zone comprising a sub-grouping of devices, a zone comprising a plurality of devices that are selected without regard to which physical network the devices are associated with and without regard to whether the devices in a same zone are in a same physical network or in another physical network, wherein devices in a given zone are authorized to communicate:
  (i) with other devices in the same zone that are on the same physical network, and
  (ii) with other devices in the same zone that are on different physical networks isolated by a network device, but
  (iii) not with other devices in the same physical network that are in different zones;

the configuration file further including unauthorized zone data specifying unauthorized zones for which devices in a particular zone are not authorized to communicate with devices in designated unauthorized zones;

the computer system operative to:

passively monitor network communications by capturing packet header information from packets communicated between devices that have been assigned to the zones;

determine the zones participating in the monitored network communications based upon the unauthorized zone data in the configuration file;

determine unauthorized network usage based upon the unauthorized zone data and captured packet header information indicating that a device in a first zone is attempting to communicate with a device in a second but unauthorized zone; and provide an alarm signal upon detection of unauthorized network usage.

31. The system of claim 30, wherein the processor is further operative to provide an address of a device that is attempting to communicate with a device in an unauthorized zone to a filtering table to block the unauthorized network usage.

32. The system of claim 31, wherein the filtering table comprises a list of source or destination addresses used to block unauthorized network usage.

33. The system of claim 30, wherein a configuration file is provided for each zone.

34. The system of claim 30, wherein a zone is defined by an IP address prefix, and wherein devices having the same IP address prefix are assigned to a single zone.

35. The system of claim 30, wherein a subnet mask divides a network into predefined zones.

36. The system of claim 30, wherein devices in one zone are allowed to communicate with devices in another zone utilizing a predetermined allowable service.

37. The system of claim 36, wherein the alarm is generated if a device in one zone communicates with a device in another zone using an unauthorized service.

38. The system of claim 30, wherein the zones are classified by user functions.

39. The system of claim 30, wherein the zones are classified by subnet.

40. The system of claim 30, wherein the zone data includes an additional zone for outside devices.

41. The system of claim 30, wherein the devices operate behind a firewall.

42. The system of claim 30, wherein the configuration file further includes override service data specifying particular network services in which devices in designated zones are authorized to communicate with devices in unauthorized zones notwithstanding the unauthorized zone data, and wherein the processor is operative to permit the communication between devices in response to the override service data.

43. In a data communication network wherein packets are communicated between devices on the data communication network, a system for providing an alarm signal indicating unauthorized network usage by a device on the data communication network, comprising:
a computer system including a processor and a memory storing a configuration file that includes data reflecting prior assignment of a plurality of devices connected to the data communication network into a plurality of zones, a zone comprising a plurality of devices that are selected without regard to which physical network the devices are associated with and without regard to whether the devices in a same zone are in a same physical network or in another physical network, a zone comprising a plurality of devices that are authorized to communicate:
(i) with other devices that are in the same zone that are on the same physical network, and
(ii) with other devices in the same zone that are on different physical networks isolated by a network device, but
(iii) not with other devices that are on the same physical network but in different zones;
the configuration file further including unauthorized zone data specifying unauthorized zones for which devices in a particular zone are not authorized to communicate with devices in other unauthorized zones;
the computer system operative to:
receive override service data specifying particular network services for which devices in designated zones are authorized to communicate with devices in other unauthorized zones notwithstanding the unauthorized zone data;
passively monitor network communications by capturing packet header information from packets communicated between devices;
determine which devices are participating in the monitored network communications based on captured packet header information;
determine the zones participating in the monitored network communications based upon the unauthorized zone data in the configuration file;
determine unauthorized network usage based upon the unauthorized zone data, the override service data, and captured packet header information indicating that a device as a client in a first zone is attempting to communicate with a device as a server in a second but unauthorized zone and has not been overridden by the override service data; and
provide an alarm upon detection of unauthorized network usage.

44. The system of claim 43, wherein the processor is further operative to provide an address of a device that is attempting to communicate with a device in an unauthorized zone to a filtering table to block the unauthorized network usage.

45. The system of claim 44, wherein the filtering table comprises a list of source or destination addresses used to block unauthorized network usage.

46. The system of claim 43, wherein a configuration file is provided for each zone.

47. The system of claim 43, wherein a zone is defined by an IP address prefix, and wherein devices having the same IP address prefix are assigned to a single zone.

48. The system of claim 43, wherein a subnet mask divides a network into predefined zones.

49. The system of claim 43, wherein devices in one zone are allowed to communicate with devices in another zone utilizing a predetermined allowable service.

50. The system of claim 49, wherein the alarm is generated if a device in one zone communicates with a device in another zone using an unauthorized service.

51. The system of claim 43, wherein the zones are classified by user functions.

52. The system of claim 43, wherein the zones are classified by subnet.

53. The system of claim 43, wherein the zone data includes an additional zone for outside devices.

54. The system of claim 43, wherein the devices operate behind a firewall.

55. The system of claim 43, wherein the configuration file further includes override service data specifying particular network services in which devices in designated zones are authorized to communicate with devices in unauthorized zones notwithstanding the unauthorized zone data, and wherein the processor is operative to permit the communication between devices in response to the override service data.

56. In a data communication network wherein packets are communicated between devices on the data communication network, a method for a network monitoring appliance to provide an alarm signal indicating unauthorized network usage by a device on the data communication network, comprising the steps of:
providing a configuration file for use by the network monitoring appliance that includes data reflecting prior assignment of a plurality of devices on the data communication network to a plurality of communication zones, a zone comprising a sub-grouping of devices on the network that are allowed to communicate with each other, a zone comprising a plurality of devices that are selected without regard to which physical network the devices are associated with and without regard to whether the devices in a same zone are in a same physical network or in another physical network, wherein devices in each respective zone are authorized to communicate:
(i) with other devices that are in the same zone that are on the same physical network, and
(ii) with other devices in the same zone that are on different physical networks isolated by a network device, but
(iii) not with other devices that are on the same physical network but in different zones;
determining from the configuration file allowed network services that are allowed to be provided by a device as host in one zone to devices in different communication zones and storing the allowed network services as zone data;
determining the zones participating in the monitored network communications based on information in the configuration file;
passively monitoring the communications between the plurality of communication zones within the data communication network with the network monitoring appliance by capturing packet header information from packets communicated between devices that have been assigned to the zones;
determining unauthorized network usage based upon the zone data and captured packet header information indicating that a device in a first zone is either (i) attempting to communicate with a device in a second zone for which communication is not authorized or (ii) attempting to utilize a service of a host in a second zone that is not allowed; and generating an alarm from the network monitoring appliance upon the detection of unauthorized network usage.

57. The method of claim 56, further comprising the step of providing an address of a device that is attempting to communicate with a device in an unauthorized zone to a filtering table to block the unauthorized network usage.

58. The method of claim 57, wherein the filter table comprises a list of source or destination addresses used to block unauthorized network usage.

59. The method of claim 56, wherein a configuration file is provided for each zone.

60. The method of claim 56, wherein a zone is defined by an IP address prefix, and wherein devices having the same IP address prefix are assigned to a single zone.

61. The method of claim 56, wherein a subnet mask divides a network into predefined zones.

62. The method of claim 56, wherein devices in one zone are allowed to communicate with devices in another zone utilizing a predetermined allowable service.

63. The method of claim 62, wherein the alarm is generated if a device in one zone communicates with a device in another zone using an unauthorized service.

64. The method of claim 56, wherein the zones are classified by user functions.

65. The method of claim 56, wherein the zones are classified by subnet.

66. The method of claim 56, wherein the zone data includes an additional zone for outside devices.

67. The method of claim 56, wherein the devices operate behind a firewall.

68. The method of claim 56, wherein the configuration file further includes override service data specifying particular network services in which devices in designated zones are authorized to communicate with devices in unauthorized zones notwithstanding the unauthorized zone data, and further comprising the step of permitting the communication between devices in response to the override service data.

69. A computer program product that includes a non-transitory computer readable medium that is executable by a processor, the medium having stored thereon a sequence of instructions that when executed by the processor causes the processor to execute the steps of:

accessing a configuration file that includes data reflecting prior assignment of a plurality of data communication devices into a plurality of zones where devices assigned to a first zone are not authorized to communicate with devices assigned to a second zone, a zone comprising a plurality of devices that are selected without regard to which physical network the devices are associated with and without regard to whether the devices in a same zone are in a same physical network or in another physical network, a zone comprising a plurality of devices that are authorized to communicate:

(i) with other devices in the same zone that are on the same physical network, and (ii) with other devices in the same zone that are on different physical networks isolated by a network device, but (iii) not with other devices in the same physical network that are in different zones;

the configuration file further including unauthorized zone data specifying designated zones for which devices in a particular zone are not authorized to communicate with other devices in a different unauthorized zone;

passively monitoring network communications of the computer network by monitoring packets communicated between devices that have been assigned to the plurality of zones;

capturing packet header information from monitored network communications;

in response to captured packet header information from a device on the computer network, accessing the configuration file to determine whether said device is authorized communicate packets with another device in the computer network;

determining the zones participating in the monitored network communications based on information in the configuration file;

determining unauthorized network usage based upon the unauthorized zone data in the configuration file and captured packet header information indicating that a device in a first zone is attempting to communicate with a device in a second but unauthorized zone; and upon detection of unauthorized network usage, generating an alarm for use by external equipment.

70. The computer program product of claim 69, wherein the step of generating an alarm includes providing an address to a filtering table to block the unauthorized network usage.

71. The computer program product of claim 69, wherein the steps of the method are carried out within a network device.

72. The computer program product of claim 69, wherein the configuration file is maintained in the network device.

73. The computer program product of claim 69, further comprising the step of providing a filter table comprising a list of source or destination addresses used to block unauthorized network usage.

74. The computer program product of claim 69, wherein a configuration file is provided for each zone.

75. The computer program product of claim 69, wherein a zone is defined by an IP address prefix, and wherein devices having the same IP address prefix are assigned to a single zone.

76. The computer program product of claim 69, wherein a subnet mask divides a network into predefined zones.

77. The computer program product of claim 69, wherein devices in one zone are allowed to communicate with devices in another zone utilizing a predetermined allowable service.

78. The method of claim 77, wherein the alarm is generated if a device in one zone communicates with a device in another zone using an unauthorized service.

79. The computer program product of claim 69, wherein the zones are classified by user functions.

80. The computer program product of claim 69, wherein the zones are classified by subnet.

81. The computer program product of claim 69 wherein the zone data includes an additional zone for outside devices.

82. The computer program product of claim 69, wherein the devices operate behind a firewall.

83. The computer program product of claim 69, wherein the configuration file further includes override service data specifying particular network services in which devices in designated zones are authorized to communicate with devices in unauthorized zones notwithstanding the unauthorized zone data, and further comprising the step of permitting the communication between devices in response to the override service data.

* * * * *